(12) United States Patent
Fujita et al.

(10) Patent No.: US 12,259,340 B2
(45) Date of Patent: Mar. 25, 2025

(54) NONDESTRUCTIVE INSPECTING DEVICE, AND NONDESTRUCTIVE INSPECTING METHOD

(71) Applicant: RIKEN, Wako (JP)

(72) Inventors: Kunihiro Fujita, Wako (JP); Chihiro Iwamoto, Wako (JP); Takaoki Takanashi, Wako (JP); Yoshie Otake, Wako (JP)

(73) Assignee: RIKEN, Wako (JP)

( * ) Notice: Subject to any disclaimer, the term of this patent is extended or adjusted under 35 U.S.C. 154(b) by 182 days.

(21) Appl. No.: 18/031,745

(22) PCT Filed: Oct. 15, 2021

(86) PCT No.: PCT/JP2021/038273
§ 371 (c)(1),
(2) Date: Apr. 13, 2023

(87) PCT Pub. No.: WO2022/085591
PCT Pub. Date: Apr. 28, 2022

(65) Prior Publication Data
US 2023/0393082 A1    Dec. 7, 2023

(30) Foreign Application Priority Data
Oct. 19, 2020  (JP) .................................. 2020-175252

(51) Int. Cl.
*G01N 23/204*  (2006.01)
*G01N 23/20008*  (2018.01)

(52) U.S. Cl.
CPC . *G01N 23/20008* (2013.01); *G01N 2223/316* (2013.01)

(58) Field of Classification Search
None
See application file for complete search history.

(56) References Cited

U.S. PATENT DOCUMENTS

| 2,549,176 A | 4/1951 | Crumrine |
| 5,098,640 A | 3/1992 | Gonzani et al. |
| (Continued) | | |

FOREIGN PATENT DOCUMENTS

| CN | 110320564 A | 10/2019 |
| CN | 110333547 A | 10/2019 |
| (Continued) | | |

OTHER PUBLICATIONS

Extended European Search Report issued on Mar. 26, 2024 for European Patent Application No. 21882732.7.
(Continued)

*Primary Examiner* — Hoon K Song
(74) *Attorney, Agent, or Firm* — Volpe Koenig

(57) ABSTRACT

A nondestructive inspecting device (10) includes a neutron emission device (2) that emits a neutron beam to a local irradiation location on a surface (1a) of an inspection target (1), a detection device (3) that detects, at each of inspection positions facing the surface (1a), scattered neutrons returned from the inspection target (1) as a result of emission of the neutron beam to the irradiation location, and measures the detected number of the scattered neutrons at each of the detection positions, and a ratio calculation unit (5) that calculates, for each of the detection positions, a ratio of the detected number at the detection position to a reference value for the detection position, and outputs the ratios. The reference value is set as the detected number at each of the detection positions in an assumed case of no defects existing in the inspection target (1).

11 Claims, 17 Drawing Sheets

(56) References Cited

U.S. PATENT DOCUMENTS

| 11,754,516 | B2* | 9/2023 | Tsukada | G01V 5/222 |
| | | | | 250/391 |
| 2006/0226369 | A1 | 10/2006 | Pedersen et al. | |
| 2018/0259462 | A1* | 9/2018 | Otake | G01V 5/222 |
| 2022/0082514 | A1* | 3/2022 | Nagano | G01N 23/18 |

FOREIGN PATENT DOCUMENTS

| JP | 04-504310 A | 7/1992 |
| JP | 2019-190848 A | 10/2019 |
| JP | 2020-139806 A | 9/2020 |
| WO | 2017/043581 A1 | 3/2017 |

OTHER PUBLICATIONS

International Search Report, PCT/JP2021/038273, Dec. 28, 2021, 2 pgs.
International Preliminary Report on Patentability issued on May 4, 2023 for PCT Patent Application No. PCT/JP2021/038273.

* cited by examiner

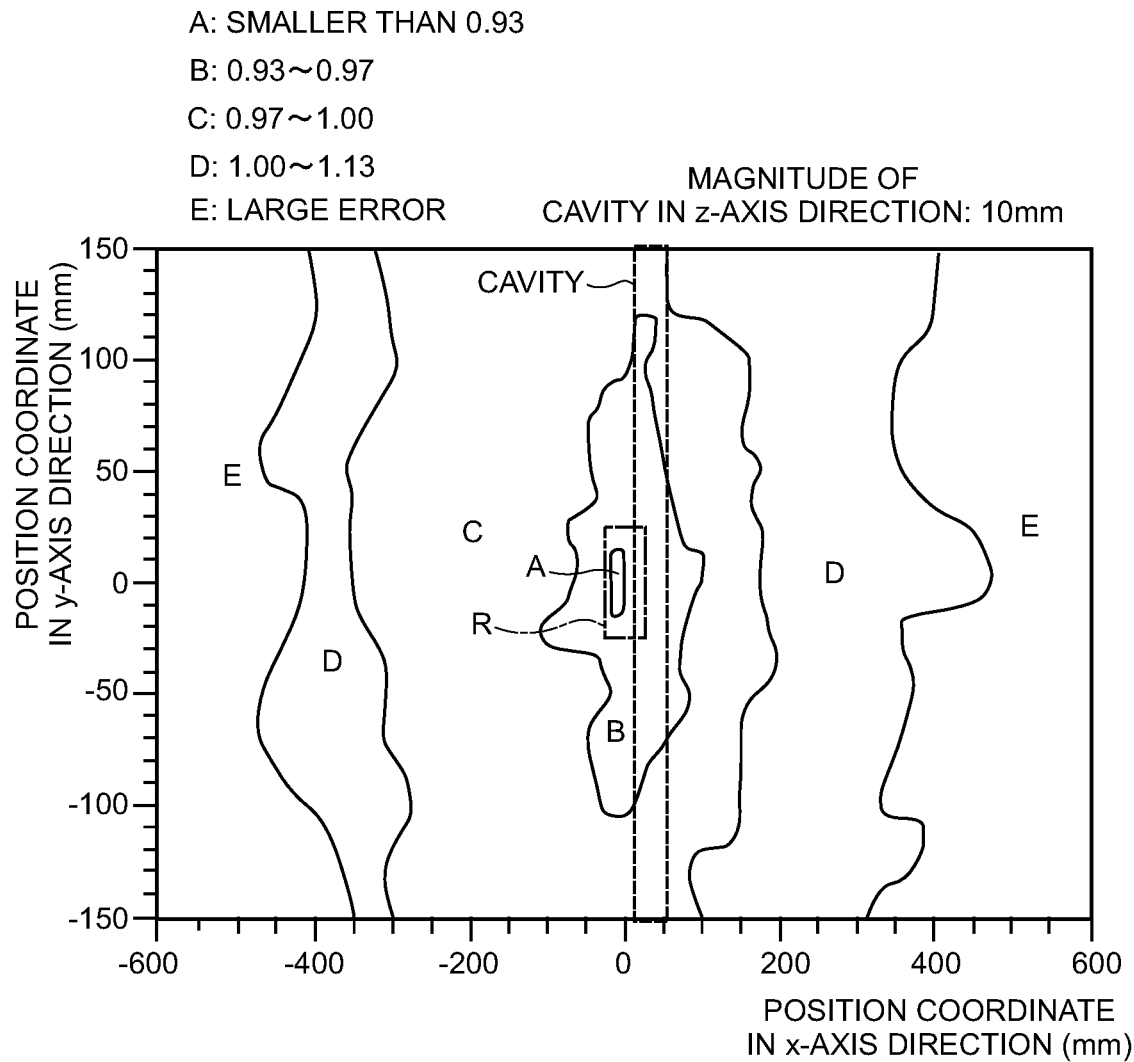

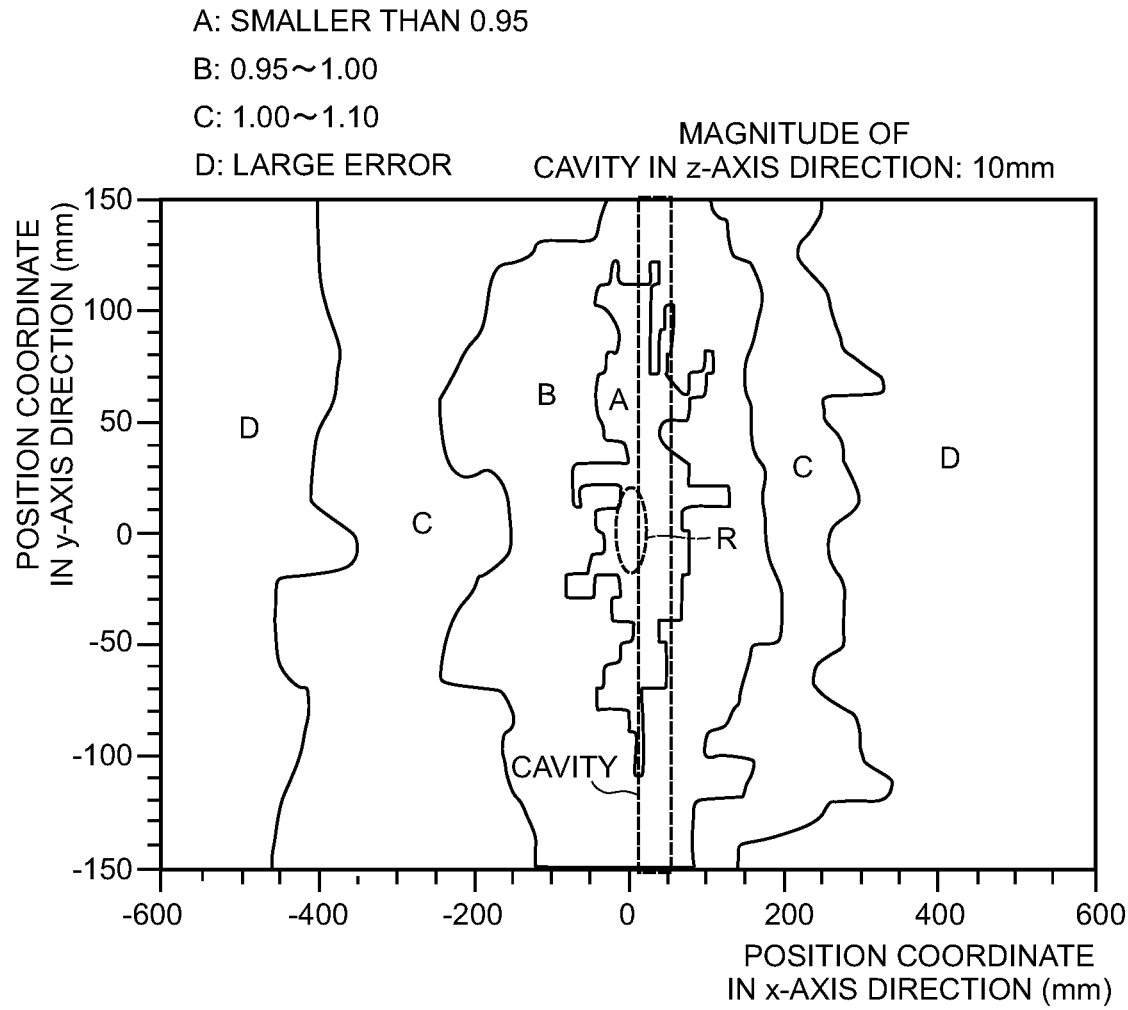

NONDESTRUCTIVE INSPECTING DEVICE, AND NONDESTRUCTIVE INSPECTING METHOD

TECHNICAL FIELD

The present invention relates to a device and a method for inspecting an inspection target, using a neutron beam. More specifically, the present invention relates to a device and a method for emitting a neutron beam to an inspection target formed by, for example, concrete, steel, or the like, and inspecting existence or absence of a defect or a type of the defect in the inspection target, based on scattered neutrons that return by being scattered inside the inspection target as a result of the emission of the neutron beam.

BACKGROUND ART

Infrastructures such as airport runways, roads (e.g., highways), tunnels, and bridges can come to have defects caused by their use and aged deterioration. For example, water staying locations, iron rust, and cavities can be generated as defects inside the infrastructures.

Patent Literature 1 discloses a technique of inspecting existence or absence of such a defect, using a neutron beam as follows. A pulsed neutron beam is emitted to an inspection target such as an infrastructure. Scattered neutrons returning by being scattered in the inspection target are detected to generate detected number data that express the number of the detected scattered neutrons in relation to time. Existence or absence of a defect inside the inspection target is determined based on the detected number data.

CITATION LIST

Patent Literatures

Patent Literature 1: International Publication No. 2017/043581

SUMMARY OF INVENTION

Technical Problem

Conventionally, it is difficult to detect existence or absence of a defect when the defect existing in an inspection target is small. For example, it is difficult so far to detect a defect of several millimeters (such as a cavity of 3 mm or a water staying location of 6 mm) generated inside an inspection target.

In view of it, an object of the present invention is to enable even a small defect (e.g., a defect of approximately 3 mm) to be detected in nondestructive inspecting on an inspection target.

Solution to Problem

In order to accomplish the above-described object, a nondestructive inspecting device according to the present invention includes:
  a neutron emission device that emits a neutron beam to a local irradiation location on a surface of an inspection target;
  a detection device that detects, at each of inspection positions facing the surface, scattered neutrons returned from the inspection target as a result of emission of the neutron beam to the irradiation location, and measures the detected number of the scattered neutrons at each of the detection positions; and
  a ratio calculation unit that calculates, for each of the detection positions, a ratio of the detected number at the detection position to a reference value for the detection position, and outputs the ratios,
wherein the reference value is set as the detected number at each of the detection positions in an assumed case of no defects existing in the inspection target.

A nondestructive inspecting method according to the present invention includes:
  a step (A) of emitting a neutron beam to a local irradiation location on a surface of an inspection target;
  a step (B) of detecting, at each of inspection positions facing the surface, scattered neutrons returned from the inspection target as a result of the step (A), and measuring the detected number of the scattered neutrons at each of the detection positions; and
  a step (C) of calculating, by a ratio calculation unit, for each of the detection positions, a ratio of the detected number at the detection position to a reference value for the detection position, and outputting the ratios,
wherein the reference value is set as the detected number at each of the detection positions in an assumed case of no defects existing in the inspection target.

Advantageous Effects of Invention

According to the present invention, a neutron beam is emitted to the local irradiation location on the surface of the inspection target. When the scattered neutrons return from the inspection target as a result of the emission, the scattered neutrons are detected at each of the inspection positions facing the surface, and the detected number of the scattered neutrons at each of the detection positions is measured. A ratio of the detected number at the detection position to a reference value for the detection position is calculated for each of the detection positions.

Even when a defect existing in the inspection target is small, one or both of an increase peak formation portion and a decrease peak formation portion of the ratio in a distribution of the ratios with respect to the detection positions occur due to the defect. Thus, even when the defect in the inspection target is small, existence or absence of the defect can be detected based on the ratios of the respective detection positions.

BRIEF DESCRIPTION OF DRAWINGS

FIG. 7A represents a two-dimensional distribution of ratios on a detection surface in the case of selectively detecting thermal neutrons in the Example 1.

FIG. 10 represents a two-dimensional distribution of ratios on the detection surface when a defect is a cavity in the Example 2.

DESCRIPTION OF EMBODIMENTS

Embodiments of the present invention are described with reference to the drawings. The same reference signs are attached to the parts that are common in the respective drawings, and overlapping description is omitted.

(Configuration of Nondestructive Inspecting Device)

Figure 1A:
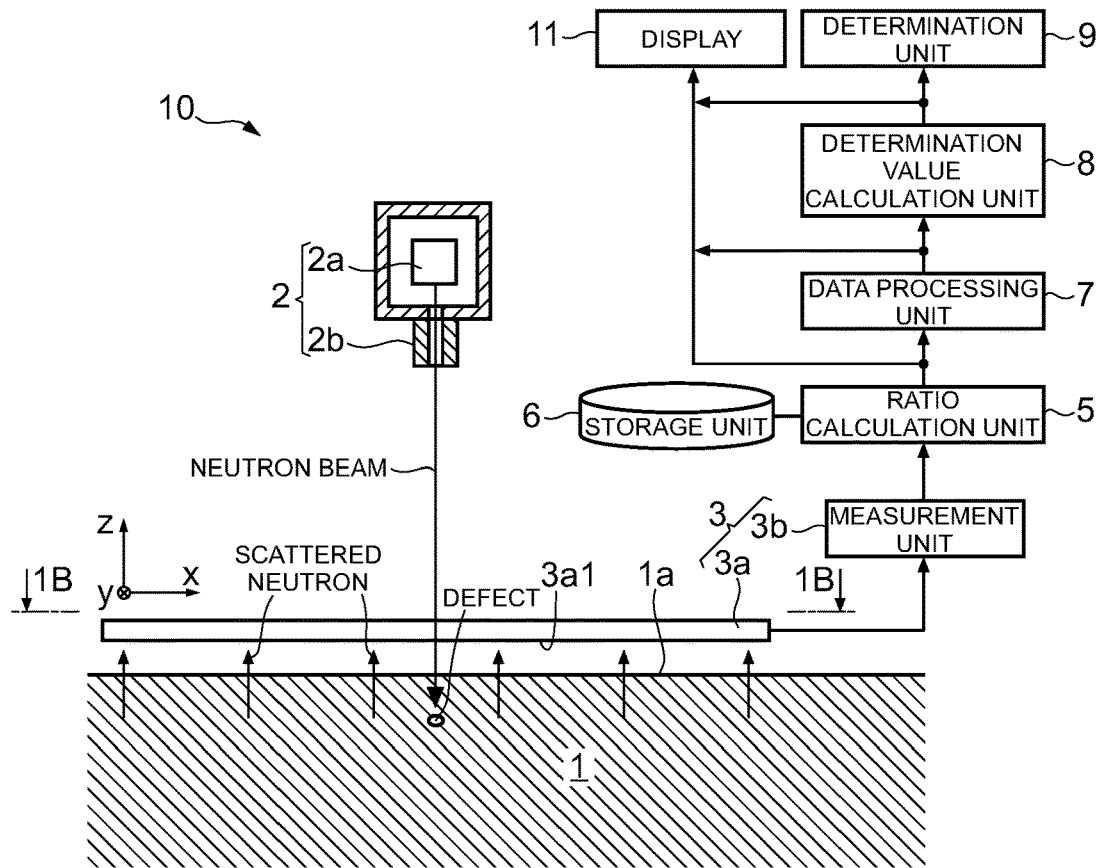
FIG. 1A illustrates a configuration of a nondestructive inspecting device according to an embodiment of the present invention.
Figure 1B:
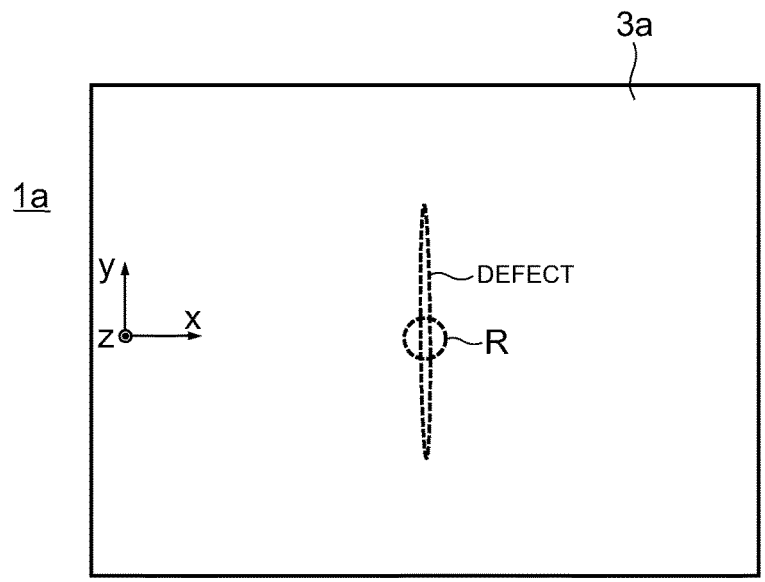
FIG. 1B is a 1B-1B arrow view in FIG. 1A.

FIG. 1A schematically illustrates a configuration of a nondestructive inspecting device 10 according to an embodiment of the present invention. FIG. 1B is a 1B-1B arrow view in FIG. 1A. The nondestructive inspecting device 10 is a device for emitting a neutron beam to an inspection target 1, detecting scattered neutrons that return from the inspection target 1 as a result of the emission, and detecting existence or absence of a defect, a type of a defect, or the like, based on the detection result of the scattered neutrons.

The inspection target 1 may be the above-described infrastructure, or may be another structure. For example, the inspection target 1 may be a structure that includes, as a constituent element, one or both of concrete and a metal member (e.g., a plurality or a large number of the metal members) such as a steel member. In the case of the inspection target 1 including such a constituent element or another constituent element, the inspection target 1 may include organic element formed of polyethylene. This organic element is, for example, a waterproof sheet or a cover (sheath) of an optical fiber cable provided inside the inspection target 1 (e.g., a structure forming a road surface).

The nondestructive inspecting device 10 includes a neutron emission device 2, a detection device 3, a ratio calculation unit 5, a data processing unit 7, a determination value calculation unit 8, and a determination unit 9.

The neutron emission device 2 emits a neutron beam to a local irradiation location R (substantially only to the irradiation location R) on a surface 1a of the inspection target 1 so that the irradiation location R is irradiated with the neutron beam. The irradiation location R may be an irradiation spot. A shape of the irradiation location R may be, for example, circular, elliptical, or rectangular, but is not limited to these.

A dimension of the irradiation location R may be equal to or smaller than 100 mm, equal to or smaller than 70 mm, or equal to or smaller than 50 mm. A lower limit of the dimension of the irradiation location R does not need to be a particular value, and may be as small as possible (e.g., the lower limit may be a value within a range equal to or larger than 0.3 mm and equal to or smaller than 10 mm). The dimension of the irradiation location R is a dimension of a cross-section of the neutron beam on the surface 1a. The dimension of the irradiation location R may mean the minimum dimension among dimensions, in respective directions, of the cross-section of the neutron beam on the surface 1a.

The neutron emission device 2 includes a neutron source 2a that emits neutrons, and a collimator 2b.

In one example, the neutron source 2a may include a target that emits neutrons by being irradiated with a charged particle beam. In this case, this target may be lithium, but is not limited to this. In another example, the neutron source 2a may be a transportable D-D fusion-based neutron generator (D-D neutron tube). In still another example, the neutron source 2a may be a radioactive source (radioactive isotope (RI) source) that emits neutrons. In this case, the radioactive neutron source may be $^{252}$Cf, but is not limited to this.

The collimator 2b shapes neutrons from the neutron source 2a into a neutron beam having a reduced cross-section. By the thus-reduced cross-section of the neutron beam, the neutron beam is made incident on the local irradiation location R on the surface 1a.

The collimator 2b may include a passage through which the neutron beam passes. This passage is formed of a material that prevents neutrons from passing therethrough. The collimator 2b may be, for example, a tubular one whose inside space is the passage.

The neutron emission device 2 may be configured so as to emit a pulsed neutron beam to the irradiation location R, or may be configured so as to emit a temporally continuous neutron beam to the irradiation location R as described below. In the former case, a pulse time width (the duration of the neutron beam) of the pulsed neutron beam is, for example, approximately 0.1 milliseconds, or shorter than 0.1 milliseconds, and a repetition frequency of the pulsed neutron beam (a frequency at which the neutron beam is emitted to the inspection target 1) is, for example, approximately 100 Hz. However, the pulse time width and the frequency are not limited to these as long as the pulse time width and the frequency do not interfere with detection of existence or absence of a defect or a type of a defect. In one example, the above-described charged particle beam may be a pulsed charged particle beam so that the neutron emission device 2 emits a pulsed neutron beam. However, the neutron emission device 2 may be configured in another manner so as to emit a pulsed neutron beam.

In an example, the neutron beam emitted by the neutron emission device 2 to the irradiation location R may mainly include fast neutrons, may include fast neutrons and thermal neutrons, or may mainly include thermal neutrons, but is not limited to these.

The detection device 3 emits the neutron beam to the irradiation location R so that scattered neutrons return from the inspection target 1. The detection device 3 detects the returning scattered neutrons at each detection position (each of a plurality of continuously arranged detection positions) facing the surface 1a of the inspection target 1. The detection device 3 measures, as the detected number, the number of the scattered neutrons detected at each detection position. For example, the detection device 3 includes a detection surface 3a1 on which the scattered neutrons are incident. Each position on the detection surface 3a1 is the detection position. The detected number for each detection position is the number of the scattered neutrons incident on the detection position concerned. The detection device 3 outputs the detected number measured for each detection position, to the ratio calculation unit 5. The detection surface 3a1 may be rectangular as illustrated in FIG. 1B, or may have another shape. For example, the detection surface 3a1 may be an elongated surface.

The detection device 3 may measure the detected number over a predetermined time period. For example, this predetermined time period is a period from a time point immediately after the neutron emission device 2 emits the neutron beam to a time point when the number of scattered neutrons incident on the detection surface 3a1 per unit time becomes small (e.g., becomes equal to or smaller than a lower limit). For example, the predetermined time period may be a value equal to or larger than 10 seconds and equal to or smaller than 10 minutes. However, the predetermined time period is not limited to this, and may be set such that at least one of an increase peak formation portion and a decrease peak formation portion occurs in the below-described ratio distribution when a defect such as a water staying location or a low-density portion (e.g., a cavity) exists in the inspection target 1. Hereinafter, the detected number may mean the number of neutrons detected over the predetermined time period.

The water staying location may be a location where water simply exists. In the case of the inspection target 1 including metal, the water staying location may be a location where metal rust (e.g., iron rust) is progressing due to water. The low-density portion is a portion having a mass density lower than that of a normal portion of the inspection target (when the inspection target 1 is concrete, the low-density portion is a portion having a mass density lower than that of a normal concrete portion). Specifically, the low density portion may be a portion having a mass density that is 1/3 or less, 1/5 or less, or 1/10 or less of a mass density of a normal portion of the inspection target 1. For example, the low density portion may be a cavity. However, the low density portion is not limited to this. In an assumed case, the low density portion may be a low-density wood mixed into the inspection target (e.g., concrete), or may be another portion.

The detection device 3 includes a detector 3a and a measurement unit 3b. Hereinafter, the inspection time means the time (i.e., the time of performing the below-described step S3) when the neutron beam is emitted to the irradiation location R on the surface 1a of the inspection target 1 in order to inspect existence or absence of a defect, or the like in the inspection target 1. Hereinafter, the inspection means inspecting of existence or absence of a defect, or the like in the inspection target 1 by such emitting of the neutron beam (i.e., means performing the below-described steps S3 to S8 or performing the below-described beam scanning).

The detector 3a (detection surface 3a1) is arranged so as to face the surface 1a of the inspection target 1 at the inspection time. In this arrangement, a part (e.g., a center of the detector 3a (detection surface 3a1)) of a large number of detection positions in the detector 3a face the irradiation location R. In this case, at the inspection time, the neutron beam from the neutron emission device 2 passes through the detector 3a (detection surface 3a1) and is made incident on the surface 1a of the inspection target 1. In one example, the detection surface 3a1 is a surface (e.g., an imaginary surface) extending two-dimensionally in the detector 3a. FIG. 1A indicates the xyz coordinate system having mutually orthogonal x-axis, y-axis, and z-axis. In the example of FIG. 1A, the detection surface 3a1 is parallel to the xy plane. The xyz coordinate system in FIG. 1A is provided for convenience of description, and in actual practical use, any coordinate axis may indicate any direction (the same applies to the xyz coordinate systems in other drawings).

At the inspection time, the detector 3a (detection surface 3a1) is arranged at a position close to or in contact with the surface 1a. Here, the position close to the surface 1a may be, for example, a position within 30 mm, within 50 mm, within 100 mm, or within 300 mm from the surface 1a, but is not limited to these. At the inspection time, the detection surface 3a1 may be parallel to the surface 1a of the inspection target 1.

The detector 3a may be a position sensitive detector (PSD). Each time a neutron is incident on the detection surface 3a1, the detector 3a outputs a detection signal associated with the detection position that is included in the detection surface 3a1 and on which the neutron is incident.

The detector 3a may be configured so as to selectively detect thermal neutrons without detecting neutrons other than thermal neutrons. In this case, the detector 3a may be a detector including a helium-3 ($^3$He) proportional counter, or may be a detector of a combination of an optical sensor and a scintillator including lithium-6 ($^6$Li).

Alternatively, the detector 3a may be configured so as to selectively detect intermediate neutrons without detecting neutrons other than intermediate neutrons. In this case, the detector 3a may be a detector of a combination of an optical sensor and a scintillator including at least one of chlorine ($^{35}$Cl) and bromine ($^{79}$Br, $^{81}$Br). For example, the detector 3a may be a detector of a combination of an optical sensor and a scintillator including CLYC or LaBr$_3$.

The detector 3a is not limited to the above-described ones, and may be, for example, a detector of a combination of an optical sensor and a scintillator including $^{155}$Gd, $^{157}$Gd, 1° B, or the like. Each of the above-described optical sensors may be a photomultiplier tube or a silicon photomultiplier (SiPM), but is not limited to these.

Generally, a thermal neutron indicates a neutron having energy equal to or lower than approximately 25 meV at room temperature, an intermediate neutron indicates a neutron having energy (equal to or higher than several keV and lower than several hundreds keV) sufficiently higher energy than that of a thermal neutron, and a fast neutron indicates a neutron having energy equal to or higher than several hundreds keV. Here, there is no strict definition for classifying neutrons into these names by energy thresholds. For this reason, in the definition of the present application, a thermal neutron may be a neutron having energy equal to or lower than several tens meV (e.g., 50 meV), and an intermediate neutron may be a neutron having energy equal to or higher than several keV (e.g., 5 keV) and lower than several hundreds keV (e.g., 500 keV), and a fast neutron may be a neutron having energy equal to or higher than several hundreds keV (e.g., 500 keV).

The measurement unit 3b measures, for each detection position, the detected number of scattered neutrons incident on the detection position, based on a large number of detection signals output from the detector 3a. In the case of using the above-described optical sensor, the measurement unit 3b may be incorporated in the above-described optical sensor such as a SiPM.

The ratio calculation unit 5 calculates, for each detection position in the detector 3a, a ratio (hereinafter, referred to simply as a ratio) of the detected number at the detection position to a reference value for the detection position. For each detection position, the reference value is set as the detected number in the assumed case of no defects existing in the inspection target 1. In other words, the reference value is the detected number measured in the case of performing the inspection on the inspection target 1 having no defects. The reference value may vary depending on the detection position for which the reference value is set. In other words, the respective reference values for at least a part of the detection positions may be different from each other. The reference value for each of the detection positions in the detector 3a (detection surface 3a1) is set in advance, depending on a positional relation between the irradiation location R and the detection position, neutron scattering characteristics of the inspection target 1, and the like. The reference values for the respective detection positions may be set for each irradiation location on the inspection target 1, or may be the same for different irradiation locations when a configuration (material) of the inspection target 1 is uniform, <Manner of Setting Reference Values>

The above-described reference values may be set in advance for the respective detection positions in the detector 3a as follows. In other words, the reference value set for each detection position may be the number of neutrons (e.g., the estimated detected number) detected at the detection position in the detector 3a over the predetermined time period when the inspection is performed on the inspection target 1 having no defects under the following detection conditions (a) to (c).

(a) A positional relation and a posture relation (orientation relation) among the detector 3a (detection surface 3a1), the inspection target 1 (irradiation location R), and the neutron emission device 2 are set as predetermined positional relation and posture relation.

(b) A spectrum of the neutron beam emitted from the neutron emission device 2 to the inspection target 1 is a predetermined spectrum. The spectrum of the neutron beam means an energy distribution of a large number of neutrons emitted from the neutron emission device 2 to the inspection target 1 per unit time (e.g., in the pulse time width in the case of emitting the pulsed neutron beam). This distribution represents, for each energy value, the number of neutrons having this energy value.

(c) An intensity of the neutron beam is a predetermined intensity. The intensity of the neutron beam means the number of neutrons emitted from the neutron emission device 2 to the irradiation location R (or a unit area in the irradiation location R) on the inspection target 1, per unit time.

In one example, under the above-described detection conditions (a) to (c), the neutron emission device 2 emits neutrons to one irradiation location R in the actual inspection target 1 (e.g., the inspection target 1 assumed to have a low probability that a defect exists therein) so that the detected number for each detection position in the detector 3a is acquired. Then, the same processing is performed again for another changed irradiation location R on the same inspection target 1. This processing is repeated so that the detected numbers at the respective detection positions in the detector 3a are acquired for each of a plurality of the irradiation locations R. Then, for each detection position in the detector 3a, an average value of a plurality of the detected numbers at the detection position acquired for a plurality of the irradiation positions R is set as the reference value for the detection position.

In another example, a specimen that does not includes a defect is prepared. The specimen has the same configuration (composition and the like) as that of the actual inspection target 1 (e.g., the inspection target 1 assumed to have a high probability that a defect exists therein). For this specimen regarded as the inspection target 1, the neutron emission device 2 emits neutrons to an irradiation location R in the specimen under the above-described detection conditions (a) to (c) so that the detected number for each detection position in the detector 3a is acquired and set as the reference value for the detected position.

In still another example, simulation is performed on the case where the inspection is performed on the inspection target 1 including no defects, under the above-described detection conditions (a) to (c). Thereby, the detected number acquired at each detection position in the detector 3a is calculated, and is set as the reference value for the detection position. Such simulation may be performed, for example, on the inspection target 1 assumed to have a high probability that a defect exists therein.

The reference value for each detection position in the detector 3a (detection surface 3a1) becomes smaller as the detection position is more shifted from the neutron beam irradiation location on the surface 1a of the inspection target 1 (e.g., refer to FIG. 6A and FIG. 6B described below), when viewed in the direction in which the neutron beam is incident on the surface 1a of the inspection target 1 under the above-described detection conditions (a) to (c).

The reference value for each detection position in the detector 3a may be stored in a storage unit 6 of the nondestructive inspecting device 10. In this case, for each detection position in the detector 3a, the ratio calculation unit 5 calculates the ratio, based on the reference value in the storage unit 6 and the above-described detected number.

The data processing unit 7 performs data processing on the ratios for the respective detection positions in the detector 3a output by the ratio calculation unit 5. The data processing unit 7 identifies an increase peak formation portion and a decrease peak formation portion of the ratio in a distribution (hereinafter, simply referred to also as a ratio distribution) of the ratios with respect to the detection positions in the detector 3a. The data processing unit 7 also determines magnitude of the identified increase peak formation portion and magnitude of the identified decrease peak formation portion.

<Ratio Distribution>

FIG. 2A to FIG. 2D schematically illustrate ratio curves C1 to C4 representing ratio distributions with respect to the detection position.

Figure 2A:
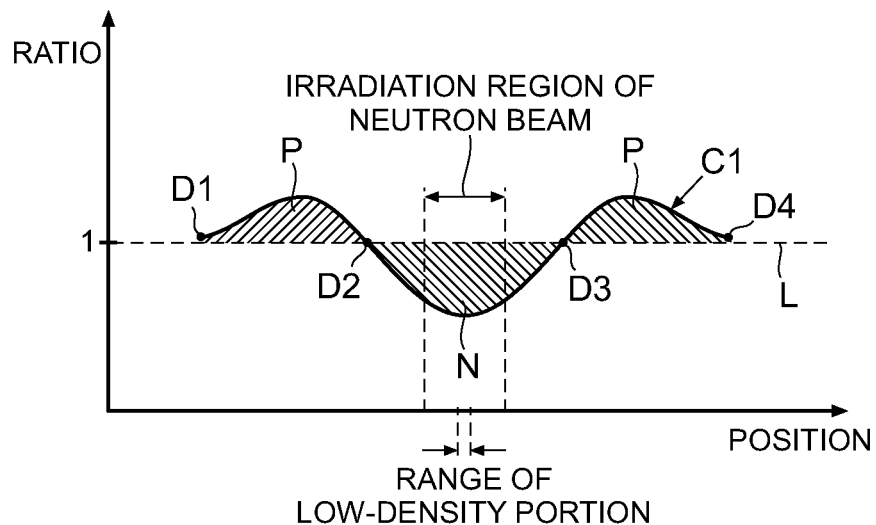
FIG. 2A and FIG. 2B illustrate the cases in each of which a low-density portion (e.g., a cavity) exists as a defect inside an inspection target.
Figure 2B:
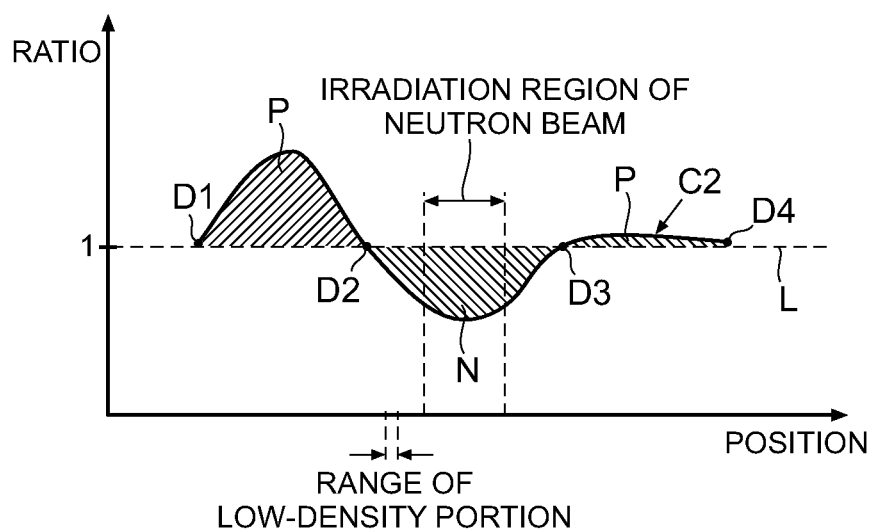
Figure 2C:
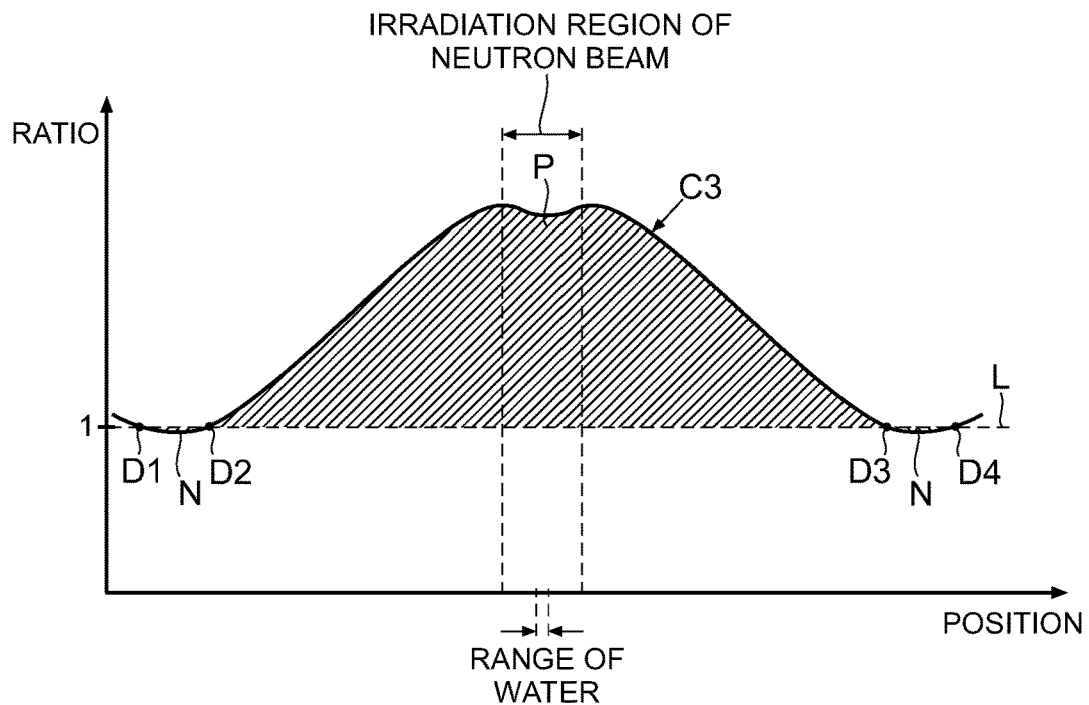
FIG. 2C and FIG. 2D illustrate the cases in each of which water exists as a defect inside the inspection target.
Figure 2D:
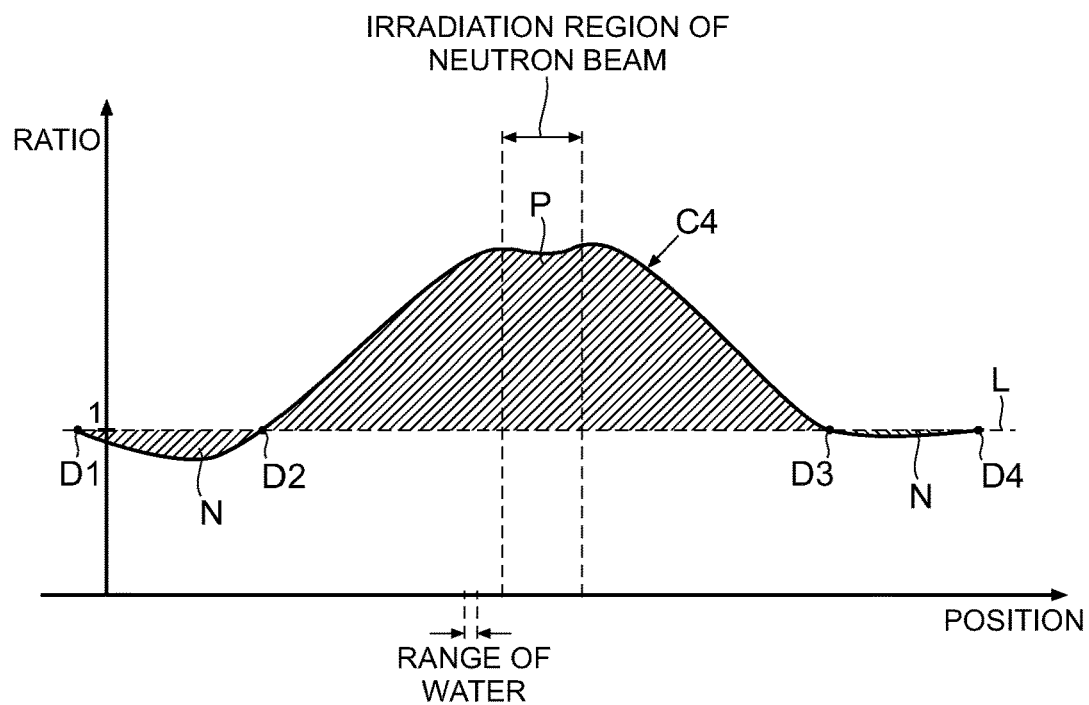

FIG. 2A and FIG. 2B illustrate the cases in each of which a low-density portion (e.g., a cavity) exists as a defect inside the inspection target 1. FIG. 2C and FIG. 2D illustrate the cases in each of which water exists as a defect inside the inspection target 1. FIG. 2A and FIG. 2C illustrate the cases in each of which the defect in the inspection target 1 exists on an extension line of the neutron beam emitted to the inspection target 1. FIG. 2B and FIG. 2D illustrate the cases in each of which the defect in the inspection target 1 exists at a position deviated from the extension line of the neutron beam emitted to the inspection target 1.

In FIG. 2A to FIG. 2D, the horizontal axis indicates the detection position (x coordinate) in the detector $3a$ in the x-axis direction (left-right direction) in FIG. 1A, and the vertical axis indicates the ratio of the detected number. The ratio distributions in FIG. 2A to FIG. 2D represent distributions at a constant y-coordinate (refer to FIG. 1B) that is the same as a y-coordinate of the irradiation location R. FIG. 2A to FIG. 2D illustrate the cases in each of which the detected number is the detected number of thermal neutrons. However, the ratio distributions even when the detected number is the detected number of intermediate neutrons have the same tendencies as those in FIG. 2A to FIG. 2D.

As illustrated in each of FIG. 2A to FIG. 2D, the decrease peak formation portion and the increase peak formation portion occur due to the defect existing in the inspection target 1. The decrease peak formation portion is a portion where the ratio is smaller than 1 and where a decrease peak (a peak in the negative direction) of the ratio is formed. The increase peak formation portion is a portion where the ratio is larger than 1 and where an increase peak (a peak in the positive direction) of the ratio is formed.

In each of FIG. 2A and FIG. 2B, the decrease peak formation portion is a portion from the point D2 to point D3 on the ratio curve C1 or C2 representing the ratio distribution, and the increase peak formation portion is a portion from the point D1 to the point D2 on the ratio curve C1 or C2 and a portion from the point D3 to the point D4 on the ratio curve C1 or C2.

In each of FIG. 2C and FIG. 2D, the decrease peak formation portion is a portion from the point D1 to the point D2 on the ratio curve C3 or C4 and a portion from the point D3 to the point D4 on the ratio curve C3 or C4, and the increase peak formation portion is a portion from the point D2 to the point D3 on the ratio curve C3 or C4.

Magnitude of the decrease peak formation portion is an area (an area of the hatched portion indicated by the sign N in FIG. 2A to FIG. 2D) of a region sandwiched between a portion where the ratio is 1 (the straight line L indicated by the dashed line in FIG. 2A to FIG. 2D) and the decrease peak formation portion. In other words, the magnitude of the decrease peak formation portion may be $\int\{1-f(x)\}dx$ when the ratio curve is expressed by "ratio=f(x)", where x is a position coordinate (an x-axis coordinate in FIG. 1A). This integration is performed over the x section of the decrease peak formation portion.

Similarly, magnitude of the increase peak formation portion is an area (an area of the hatched portion indicated by the sign P in FIG. 2A to FIG. 2D) of a region sandwiched between the portion where the ratio is 1 (the straight line L indicated by the dashed line in FIG. 2A to FIG. 2D) and the increase peak formation portion. In other words, the magnitude of the increase peak formation portion may be $\int\{f(x)-1\}dx$ when the ratio curve is expressed by "ratio=f(x)", where x is a position coordinate (an x-axis coordinate in FIG. 1A). This integration is performed over the x section of the increase peak formation portion.

Low-Density Portion as Defect

In the following description, it is assumed that a low-density portion as a defect is a cavity. However, the following contents also apply to the case of another assumed low-density portion as a defect. In this case, in the following, each "cavity" may be replaced with "low-density portion".

When a defect existing inside the inspection target 1 is a cavity, a decrease peak formation portion of the ratio occurs in the vicinity of a region facing the cavity (i.e., in the vicinity of the same x-coordinate as that of the cavity), in the ratio distribution in the detector $3a$, as illustrated in FIG. 2A.

This decrease peak formation portion is formed for the following reasons. Neutrons are not scattered in the cavity. Thus, neutrons emitted to the inspection target 1 are not scattered from the cavity to the detector $3a$ when passing through the cavity in a direction away from the surface $1a$ of the inspection target 1. Accordingly, the detected number of scattered neutrons is decreased, by such an extent, in the vicinity of a region facing the cavity, on the detection surface $3a1$, and thus, the decrease peak formation portion occurs. Fast neutrons incident on the inspection target become thermal neutrons in the course of passing in the inspection target (e.g., concrete). However, existence of the cavity in the inspection target 1 hinders generation of thermal neutrons by such an extent. Accordingly, the detected number of scattered thermal neutrons is decreased in the vicinity of the region facing the cavity, on the detection surface $3a1$ Meanwhile, an increase peak formation portion (a peak in the positive direction) of the ratio occurs in a region adjacent to the vicinity (the decrease peak formation portion) of the region facing the cavity, in the ratio distribution (ratio curve C1) in the detector $3a$, as illustrated in FIG. 2A.

This increase peak formation portion is formed for the following reason. Scattered neutrons incident on the region included in the detection surface $3a1$ and adjacent to the vicinity (decrease peak formation portion) of the region facing the cavity include scattered neutrons that are scattered at a position deeper than the cavity and that pass through the cavity toward this region adjacent to the above-mentioned vicinity. These scattered neutrons passing through the cavity are not further scattered in the cavity to other directions. Because of existence of the cavity, these scattered neutrons passing the cavity have a lower possibility of being absorbed in the inspection target (e.g., concrete). Accordingly, in the region adjacent to the above-mentioned vicinity, the detected number of scattered neutrons is increased by such an extent, and thus, the increase peak formation portion occurs.

As illustrated in FIG. 2B, the ratio distribution similar to that in FIG. 2A occurs even when a position of the cavity is somewhat deviated from the extension line of the neutron beam emitted to the irradiation location R. In FIG. 2B, a relatively large increase peak formation portion occurs on a left side. This is because a larger part of scattered neutrons included in the neutron beam incident on the inspection target 1 pass through the cavity so as to be detected at the positions corresponding to the increase peak formation portion on the left side in FIG. 2B.

Water as Defect

When a defect existing inside the inspection target 1 is water (a water staying location), an increase peak formation portion of the ratio occurs in the vicinity (i.e., the vicinity of the same x-coordinate as that of the water staying location) of a region facing the water staying location, in the ratio distribution, as illustrated in FIG. 2C.

This increase peak formation portion is formed for the following reason. Scattered neutrons incident on the region included in the detection surface $3a1$ and facing the water staying location include scattered neutrons from the water staying location. Here, neutrons easily scatter with hydrogen atoms in water, and thus, the scattered neutrons from the water staying location includes a larger number of neutrons that have become thermal neutrons by scattering with hydrogen atoms in the water. Accordingly, in the region included in the detection surface $3a1$ and facing the water staying location, the detected number of scattered thermal neutrons is increased, and thus, the increase peak formation portion occurs.

A depression in the negative direction occurs in a top part of the increase peak formation portion, as illustrated in FIG. 2C, for the following reason. Neutrons have a lower possibility of being scattered from the water staying portion toward the detector 3a when passing through the water staying portion in a direction away from the surface 1a of the inspection target 1. Accordingly, at a center of the region included in the detection surface 3a1 and facing the water staying portion, the detected number of thermal neutrons is decreased by such an extent, and thus, the depression occurs.

The determination value calculation unit 8 receives from the data processing unit 7 the magnitude of the increase peak formation portion and the magnitude of the decrease peak formation portion as Sp and Sn, respectively. The determination value calculation unit 8 calculates the sum "Sp+Sn" of the magnitude of the increase peak formation portion and the magnitude of the decrease peak formation portion, and calculates a value Sn/Sp acquired by dividing the magnitude of the decrease peak formation portion by the magnitude of the increase peak formation portion. The determination value calculation unit 8 outputs the calculated values "Sp+Sn" and Sn/Sp.

When a plurality of increase peak formation portions occur in the ratio distribution, Sp may be the total magnitude of a plurality of the increase peak formation portions. Similarly, when a plurality of decrease peak formation portions occur in the ratio distribution, Sn may be the total magnitude of a plurality of the decrease peak formation portions.

Figure 3:
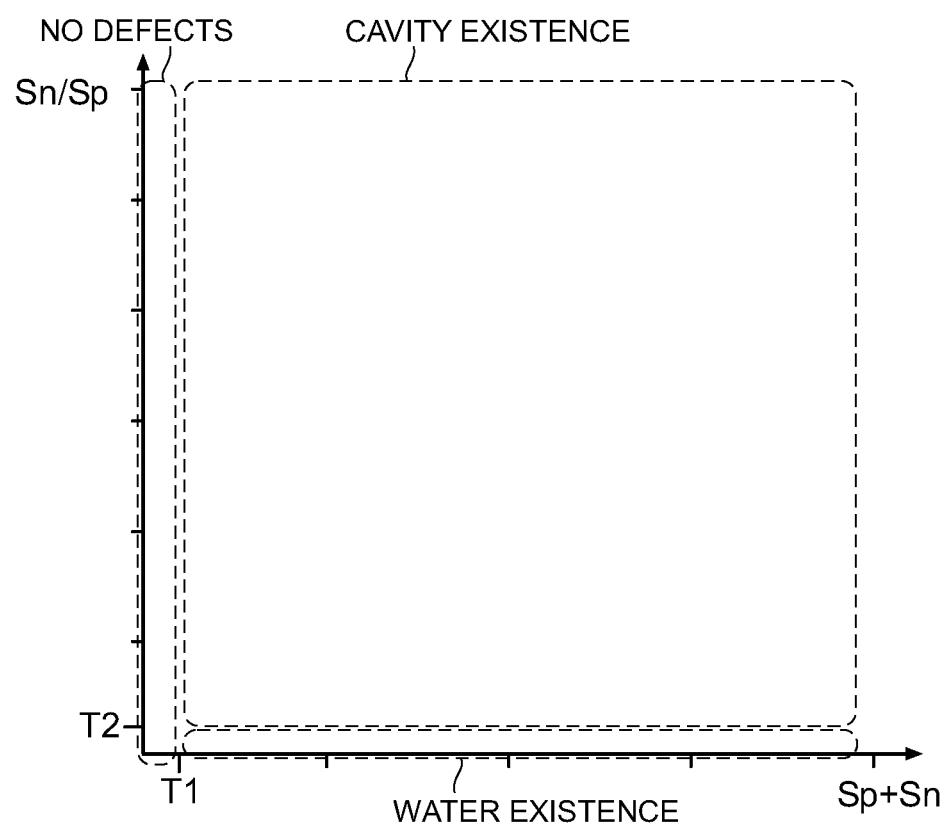
FIG. 3 is an illustration for determination of existence or absence of a defect and a type of the defect in the inspection target.

Based on the values of "Sp+Sn" and Sn/Sp output from the determination value calculation unit 8, the determination unit 9 determines existence or absence of a defect in the inspection target 1, and a type of the defect. FIG. 3 illustrates a two-dimensional coordinate system for this determination. In FIG. 3, the horizontal axis indicates a value of "Sp+Sn", and the vertical axis indicates a value of Sn/Sp.

In the case where no defects exist in the inspection target 1, no increase peak formation portions and no decrease peak formation portions occur in the ratio distribution, or a small increase peak formation portion and a small decrease peak formation portion occur even when they occur. Accordingly, in this case, a value of "Sp+Sn" is zero or a positive value close to zero. Thus, when no defects exist, a value of "Sp+Sn" is equal to or smaller than a first threshold value T1, as illustrated in FIG. 3. The first threshold value T1 is zero or a positive value close to zero.

In the case where a cavity exists as a defect in the inspection target 1, in the ratio distribution, a relatively large decrease peak formation portion occurs and an increase peak formation portion also occurs, as illustrated in FIG. 2A. Thus, when a cavity exist, a value of "Sp+Sn" is larger than the first threshold value T1, and a value of Sn/Sp is equal to or larger than a second threshold value T2, as illustrated in FIG. 3. The second threshold value T2 is a positive value.

In the case where water (water staying portion) exists as a defect in the inspection target 1, in the ratio distribution, a fairly or considerably large increase peak formation portion occurs and a decrease peak formation portion hardly occurs, as illustrated in FIG. 2C. Thus, when water exists as a defect, a value of "Sp+Sn" is larger than the first threshold T1, and a value of Sn/Sp is smaller than the second threshold T2, as illustrated in FIG. 3.

The determination unit 9 makes determination in accordance with the above-described matters, as follows. When a value of "Sp+Sn" is equal to or smaller than the first threshold value, the determination unit 9 determines that no defects exist in the inspection target 1, and outputs a defect absence signal to that effect.

When a value of "Sp+Sn" is larger than the first threshold value, the determination unit 9 determines that a defect exists in the inspection target 1, and outputs a defect existence signal to that effect. In this case, this signal may include information indicating a type of the defect as follows. When a value of "Sp+Sn" is larger than the first threshold value T1, and a value of Sn/Sp is equal to or larger than the second threshold value T2, the determination unit 9 determines that a cavity exists in the inspection target 1, and outputs a first defect signal to that effect. When a value of "Sp+Sn" is larger than the first threshold value T1, and a value of Sn/Sp is smaller than the second threshold value T2, the determination unit 9 determines that water (water staying location) exists in the inspection target 1, and outputs a second defect signal to that effect.

(Nondestructive Inspecting Method)

Figure 4:
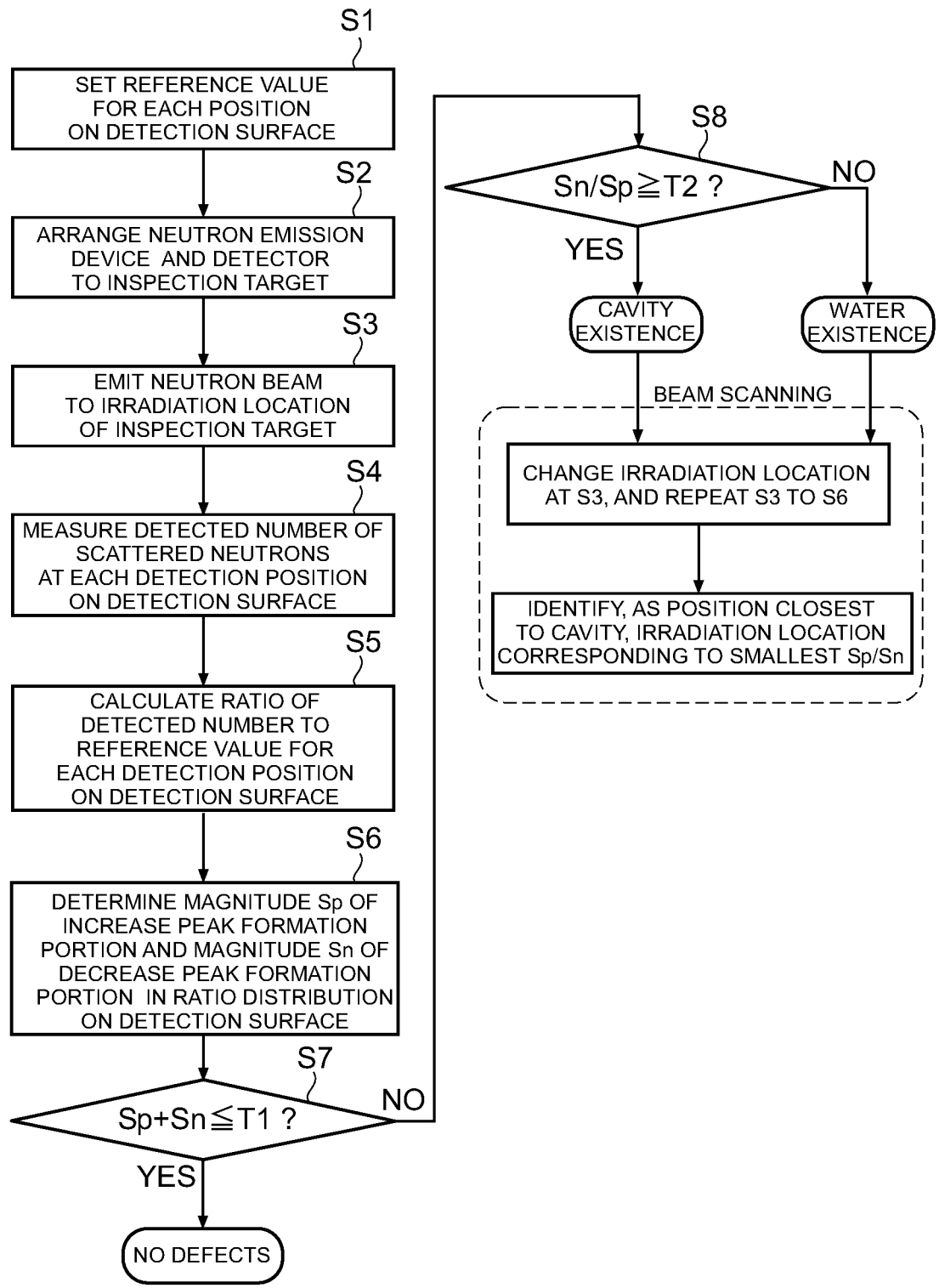
FIG. 4 is a flowchart representing a nondestructive inspecting method according to the embodiment of the present invention.

FIG. 4 is a flowchart representing a nondestructive inspecting method according to an embodiment of the present invention. This nondestructive inspecting method is performed using the above-described nondestructive inspecting device 10, and includes steps S1 to S8.

At the step S1, the reference value for each detection position in the detector 3a is set as described above.

At the step S2, the neutron emission device 2 and the detector 3a are arranged in relation to the inspection target 1.

At the step S3, the neutron emission device 2 emits a neutron beam to the local irradiation location R on the surface 1a of the inspection target 1. Such steps S2 and S3 are performed under the above-described detection conditions (a) to (c).

At the step S3, a traveling direction of the neutron beam emitted to the irradiation location R may be a direction perpendicular to the surface 1a, or may be a direction inclined from the direction perpendicular to the surface 1a.

At the step S4, the detection device 3 performs the following. At each detection position included in the detection surface 3a1 and facing the surface 1a, the detection device 3 detects the scattered neutrons returned from the inspection target 1 as a result of the step S3. For each detection position, the detection device 3 measures the detected number of the scattered neutrons.

At the step S5, based on the reference value set for each detection position at the step S1, and the detected number measured for each detection position at the step S4, the ratio calculation unit 5 calculates, for each detection position in the detection surface 3a1, a ratio of the detected number at the detection position to the reference value for the detection position. At the step S5, the ratio calculation unit 5 outputs the calculated ratios for the respective detection positions.

At the step S6, the data processing unit 7 identifies an increase peak formation portion and a decrease peak formation portion of the ratio in a distribution representing, with respect to the detection position, the ratio calculated at the step S5. At the step S6, the data processing unit 7 determines magnitude Sp of the increase peak formation portion and magnitude Sn of the decrease peak formation portion.

At the step S7, the determination value calculation unit 8 calculates a value of "Sp+Sn", and the determination unit 9 determines whether or not a defect exists inside the inspection target 1, based on the calculated value of "Sp+Sn". At the step S7, when the value of "Sp+Sn" is equal to or smaller than the first threshold value T1, the determination unit 9 determines that no defects exist inside the inspection target 1, and outputs a defect absence signal to that effect. Meanwhile, at the step S7, when the value of "Sp+Sn" is larger than the first threshold value T1, the determination unit 9 determines that a defect exists inside the inspection target 1, and the processing proceeds to the step S8.

At the step S8, the determination value calculation unit 8 calculates a value of Sn/Sp, and the determination unit 9 determines a type of the defect, based on the calculated value of Sn/Sp. At the step S8, when the value of Sn/Sp is equal to or larger than the second threshold value T2, the determination unit 9 determines that a low-density portion (e.g., a cavity) exists as the defect inside the inspection target 1, and outputs a first defect signal to that effect. Meanwhile, at the step S8, when the value of Sn/Sp is smaller than the second threshold value T2, the determination unit 9 determines that water (water staying location) exists as the defect inside the inspection target 1, and outputs a second defect signal to that effect.

<Beam Scanning>

Next after the step S8, the steps S3 to S6 may be repeated for a changed irradiation location R at the step S3. In other words, the irradiation location R on which the neutron beam is made incident in the surface 1a of the inspection target 1 differs among a plurality of times of the repeated step S3. In this case, the step S3 may be performed a plurality of times so as to scan the inspection target 1 with a neutron beam.

It is assumed that one cycle is a cycle of performing the steps S3 to S6 once. For each cycle, a value of Sp/Sn or Sn/Sp is calculated from the values Sp and Sn determined at the step S6 in the cycle. At this time, when it is determined at the above-described step S8 that a low-density portion exists as a defect, a value of Sp/Sn may be calculated, and when it is determined at the above-described step S8 that water exists as a defect, a value of Sn/Sp may be calculated.

The minimum value of Sp/Sn or Sn/Sp is identified from a plurality of the respective values Sp/Sn or Sn/Sp calculated for a plurality of the cycles. The irradiation location R (i.e., the irradiation location R in the cycle for which this minimum value of Sp/Sn or Sn/Sp has been calculated) corresponding to the identified minimum Sp/Sn or Sn/Sp is identified as a location closest to the low-density portion (cavity) or the water. Such beam scanning is described in more detail in the below-described Example 2.

Figure 5A:
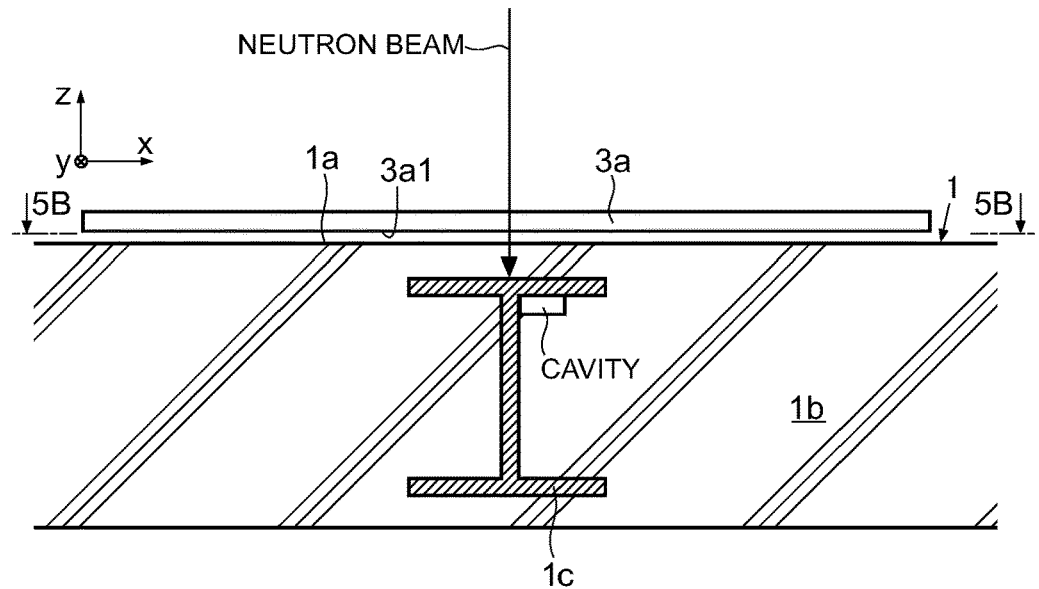
FIG. 5A illustrates a section of an inspection target in the Example 1.
Figure 5B:
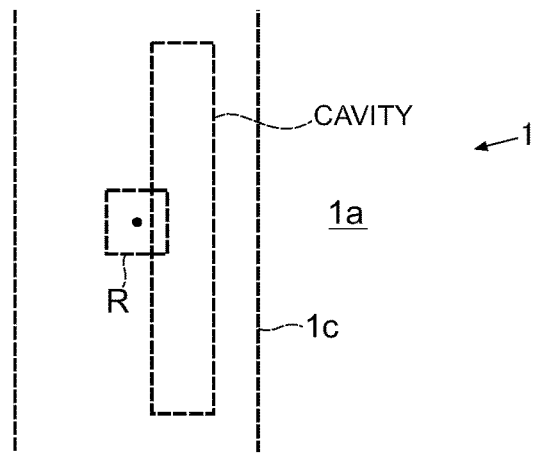
FIG. 5B is a 5B-5B arrow view in FIG. 5A.
Figure 5C:
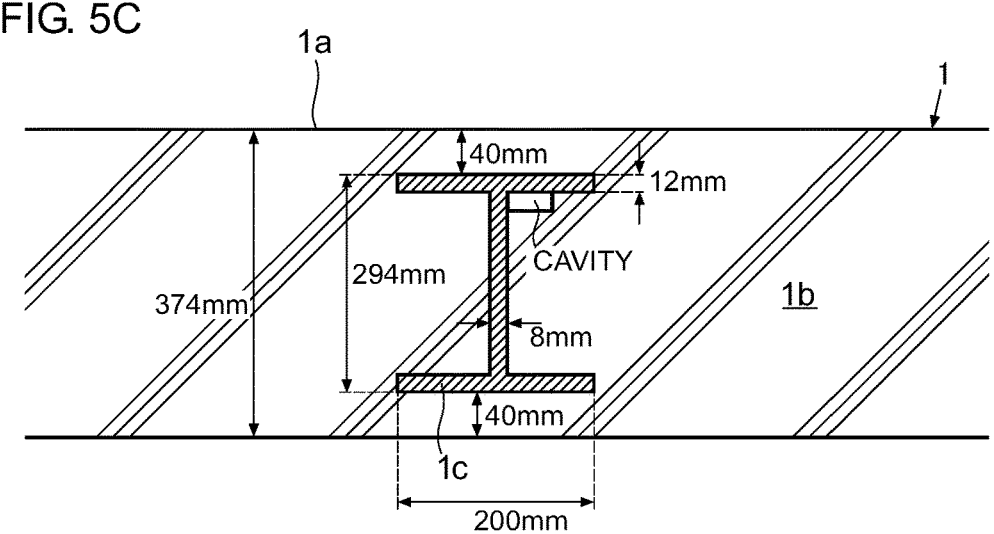
FIG. 5C represents dimensions of respective portions in FIG. 5A.

Example 1: Case of Detecting Thermal Neutrons and Case of Detecting Intermediate Neutrons The inspection was performed, using the nondestructive inspecting device 10, on the inspection target 1 (specimen) including a cavity as a defect whose position and dimension were known. FIG. 5A illustrates a section of the inspection target 1 on which the inspection was performed. FIG. 5B is a 5B-5B arrow view in FIG. 5A. The inspection target 1 in FIG. 5A includes concrete 1b and H-shaped steel 1c embedded inside the concrete 1b. FIG. 5C represents dimensions of respective portions in FIG. 5A.

As illustrated in FIG. 5A and FIG. 5B, the cavity exists as a defect inside the inspection target 1. The signs x, y, and z in FIG. 5A indicate the x-axis, y-axis, and z-axis orthogonal to each other in the xyz coordinate system.

The above-described steps S2 to S7 were performed, and the detector 3a selectively detecting thermal neutrons was used at the above-described step S4. At this time, at the step S3, a neutron beam consisting of $10^8$ neutrons was emitted to the irradiation location R illustrated in FIG. 5B. This irradiation location R has a square shape (a region surrounded by the dashed line indicated by the sign R in FIG. 5B) whose each side has a length of 50 mm The above-described experiment was performed, under the same conditions, on each of 3 mm, 10 mm, and 30 mm as a dimension of the cavity in z-axis direction while dimensions of the cavity in the x-axis direction and the y-axis direction were fixed at 50 mm and 300 mm, respectively.

Figure 6A:
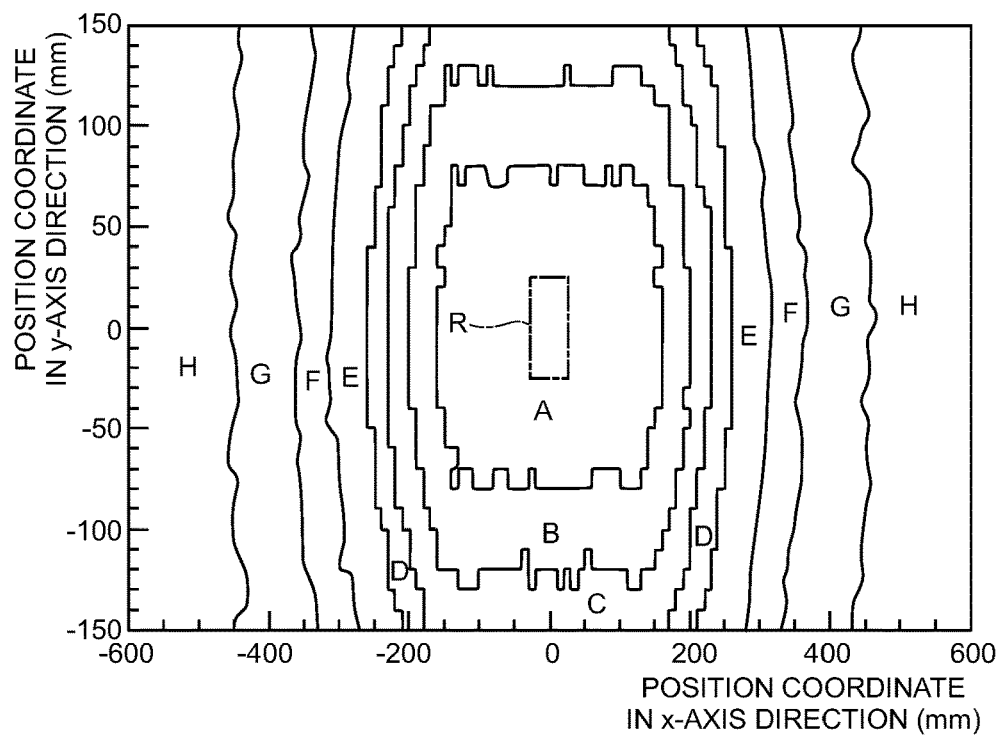
FIG. 6A represents a two-dimensional distribution of reference values for the case of selectively detecting thermal neutrons in the Example 1.
Figure 6B:
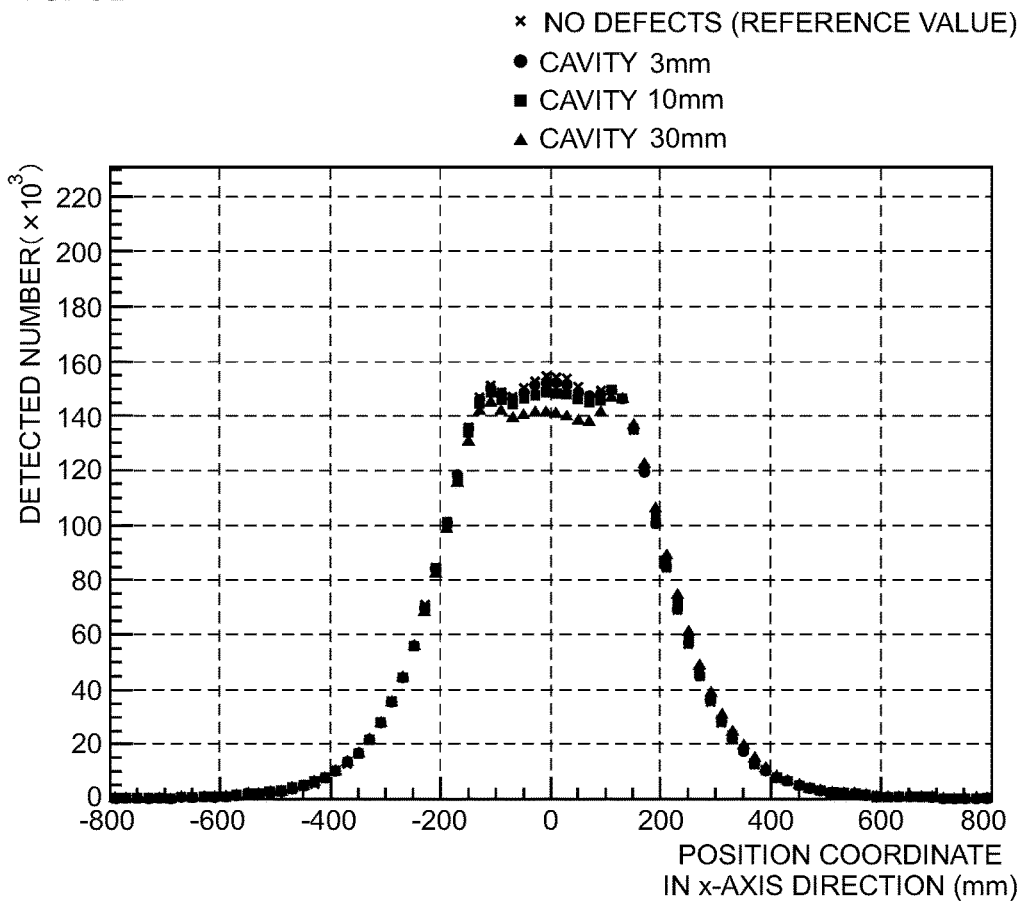
FIG. 6B represents a one-dimensional distribution, in an x-axis direction, of reference values for the case of selectively detecting thermal neutrons in the Example 1.

FIG. 6A and FIG. 6B illustrate the reference values used at the step S5, concerning the case of selectively detecting thermal neutrons. In other words, FIG. 6A and FIG. 6B represent a specific example of the detected numbers (i.e., the reference values) at respective detection positions in the detector 3a when no defects such as a cavity exist in the inspection target 1 in FIG. 5A. FIG. 6A and FIG. 6B illustrate a distribution of the reference values set by use of the specimen as described above, in the case where the detector 3a is a helium-3 ($^3$He) proportional counter. FIG. 6A illustrates the irradiation location R surrounded by the dashed line and the distribution of the reference values on a surface (detection surface 3a1) extending two-dimensionally. FIG. 6B illustrates the reference values (detected number) at the respective x-axis coordinates for the same y-axis coordinate as that of the center of the neutron beam irradiation location R on the surface 1a.

In FIG. 6A, the reference value becomes smaller in the order of the regions A to H. The respective regions in FIG. 6A are defined by approximate values as follows. The reference value is equal to or larger than $2.7 \times 10^3/cm^2$ in the region A, is equal to or larger than $1.9 \times 10^3/cm^2$ and smaller than $2.7 \times 10^3/cm^2$ in the region B, is equal to or larger than $1.4 \times 10^3/cm^2$ and smaller than $1.9 \times 10^3/cm^2$ in the region C, is equal to or larger than $1.0 \times 10^3/cm^2$ and smaller than $1.4 \times 10^3/cm^2$ in the region D, is equal to or larger than $5.2 \times 10^2/cm^2$ and smaller than $1.0 \times 10^3/cm^2$ in the region E, is equal to or larger than $2.8 \times 10^2/cm^2$ and smaller than $5.2 \times 10^2/cm^2$ in the region F, is equal to or larger than $8.0 \times 10/cm^2$ and smaller than $2.8 \times 10^2/cm^2$ in the region G, and is smaller than $8.0 \times 10/cm^2$ in the region H.

In FIG. 6B, the cross marks (x marks) indicate the reference values, and the circle marks, the square marks, and the triangle marks indicate the detected numbers when the above-described cavity exists in FIG. 5A. These circle marks, square marks, and triangle marks indicate the respective cases of 3 mm, 10 mm, and 30 mm as the dimension of the cavity in the z-axis direction. In FIG. 6B, the marks of the respective types substantially overlap with each other at positions separated by approximately 200 mm or more from the origin for the x-axis coordinates, and a mutual deviation of these marks becomes smaller at positions more separated from the origin.

The above-described experiment was performed using the detector 3a selectively detecting intermediate neutrons, with the other conditions being the same as those described above. The reference values in the case of selectively detecting intermediate neutrons were used.

Figure 7B:
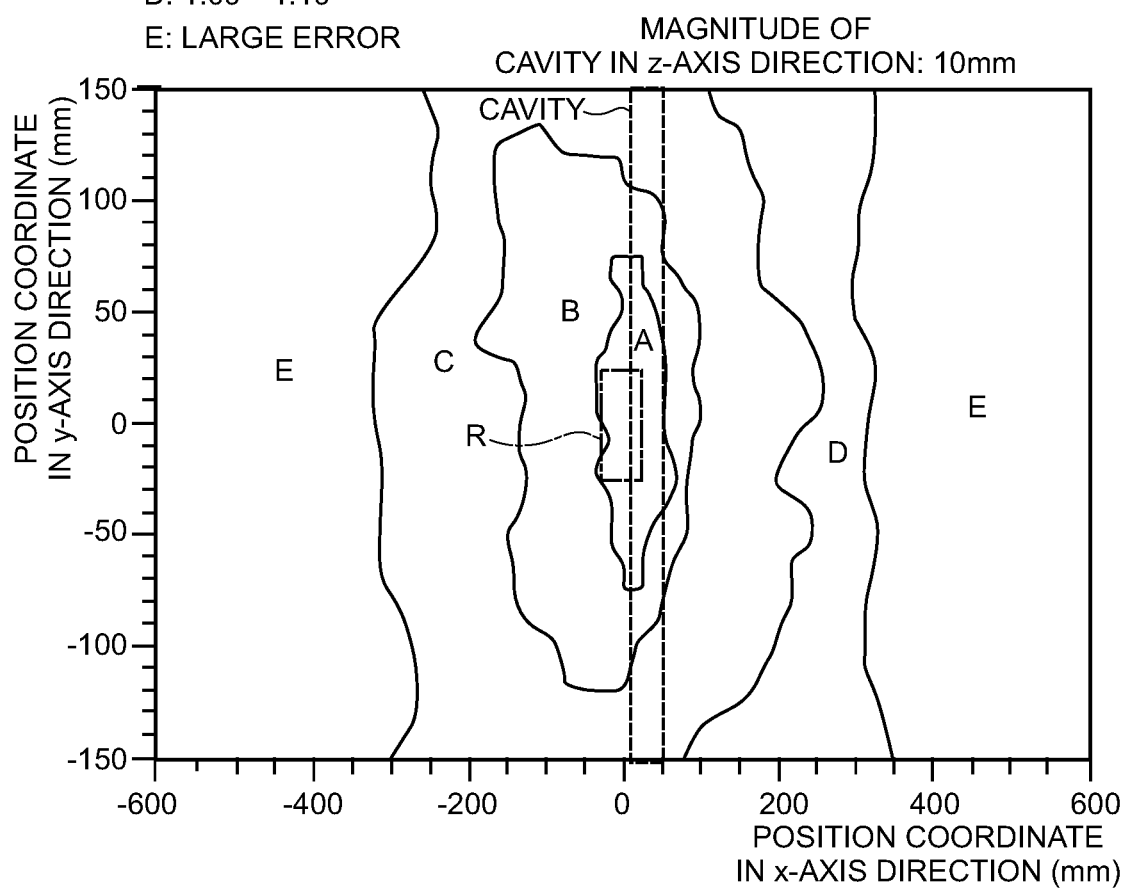
FIG. 7B represents a two-dimensional distribution of ratios on the detection surface in the case of selectively detecting intermediate neutrons in the Example 1.

FIG. 7A and FIG. 7B illustrate two-dimensional distributions of the ratios on the detection surface 3a1 when the dimension of the cavity in the z-axis direction is 10 mm. FIG. 7A represents the case of using the detector 3a that selectively detects thermal neutrons. FIG. 7B represents the case of using the detector 3a that selectively detects intermediate neutrons. In FIG. 7A and FIG. 7B, the horizontal axis and the vertical axis indicate coordinates in an x-axis direction and a y-axis direction illustrated in FIG. 5A, and the origin of each coordinate is the center of the irradiation location R. In each of FIG. 7A and FIG. 7B, the dashed line indicates an existence range of the cavity when viewed in the z-axis direction.

In FIG. 7A, the regions A to E surrounded by the solid lines represent the approximate ratio distribution on the detection surface 3a1. The ratio is smaller than 0.93 in the region A, is equal to or larger than 0.93 and smaller than 0.97 in the region B, is equal to or larger than 0.97 and smaller than 1.00 in the region C, and is equal to or larger than 1.00 and smaller than 1.13 in the region D. In the region E, an error is large.

Similarly, in FIG. 7B, the regions A to D surrounded by the solid lines represent the approximate ratio distribution on the detection surface 3a1. The ratio is smaller than 0.97 in the region A, is equal to or larger than 0.97 and smaller than 1.00 in the region B, is equal to or larger than 1.00 and smaller than 1.09 in the region C, is equal to or larger than 1.09 and smaller than 1.19 in the region D. In the region E, an error is large.

As understood from FIG. 7A and FIG. 7B, the existence of the cavity can be detected in respective cases of thermal neutrons and intermediate neutrons as detected neutrons. For example, the existence of the cavity can be determined from existence of the region where the ratio is smaller than 1 and the region where the ratio is larger than 1 (and from the matter that the ratio is the smallest near the irradiation location R) in FIG. 7A and FIG. 7B.

The region where the ratio is larger than 1 is larger when intermediate neutrons are detected. Thus, a value of "Sp+Sn" is larger when intermediate neutrons are detected. In other words, detecting intermediate neutrons can enhance sensitivity of a value of "Sp+Sn" to existence of a cavity.

Figure 8:
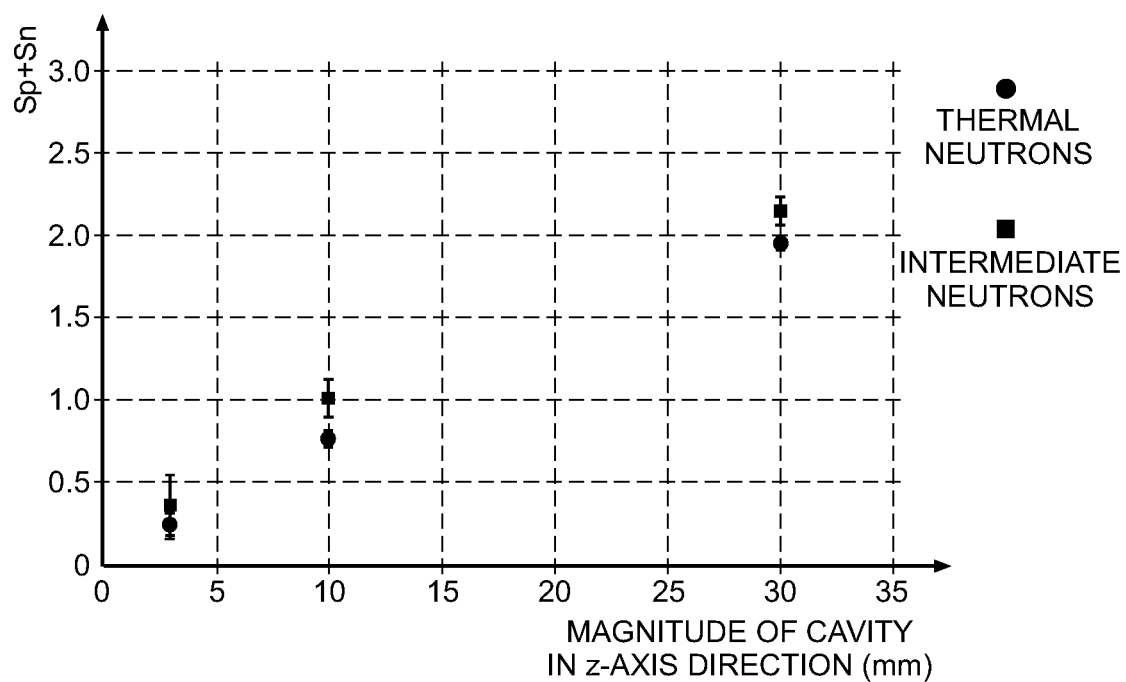
FIG. 8 represents an inspection result in the Example 1.

FIG. 8 represents values of "Sp+Sn" in the respective cases in the above-described experiment. In FIG. 8, the horizontal axis indicates a dimension of the cavity in the z-axis direction, and the vertical axis indicates the calculated value of "Sp+Sn". In FIG. 8, the circle marks indicate the case where thermal neutrons are selectively detected, and the square marks indicate the case where intermediate neutrons are selectively detected.

As illustrated in FIG. 8, even in the case where a dimension of the cavity in the z-direction is 3 mm, it can be recognized that a value of "Sp+Sn" is larger than the first threshold value T1 equal to or close to zero, even when an error causes this value to become smaller than an actual value. The detected number of intermediate neutrons tends to be smaller than that of thermal neutrons. However, as illustrated in FIG. 8, detecting intermediate neutrons enhances sensitivity of a value of "Sp+Sn" to existence of a cavity. Accordingly, when a sufficient amount of intermediate neutrons are detected, detecting intermediate neutrons in the inspection enables existence of a cavity to be detected with high sensitivity.

Example 2: Beam Scanning

<Case of Cavity as Defect>

Figure 9A:
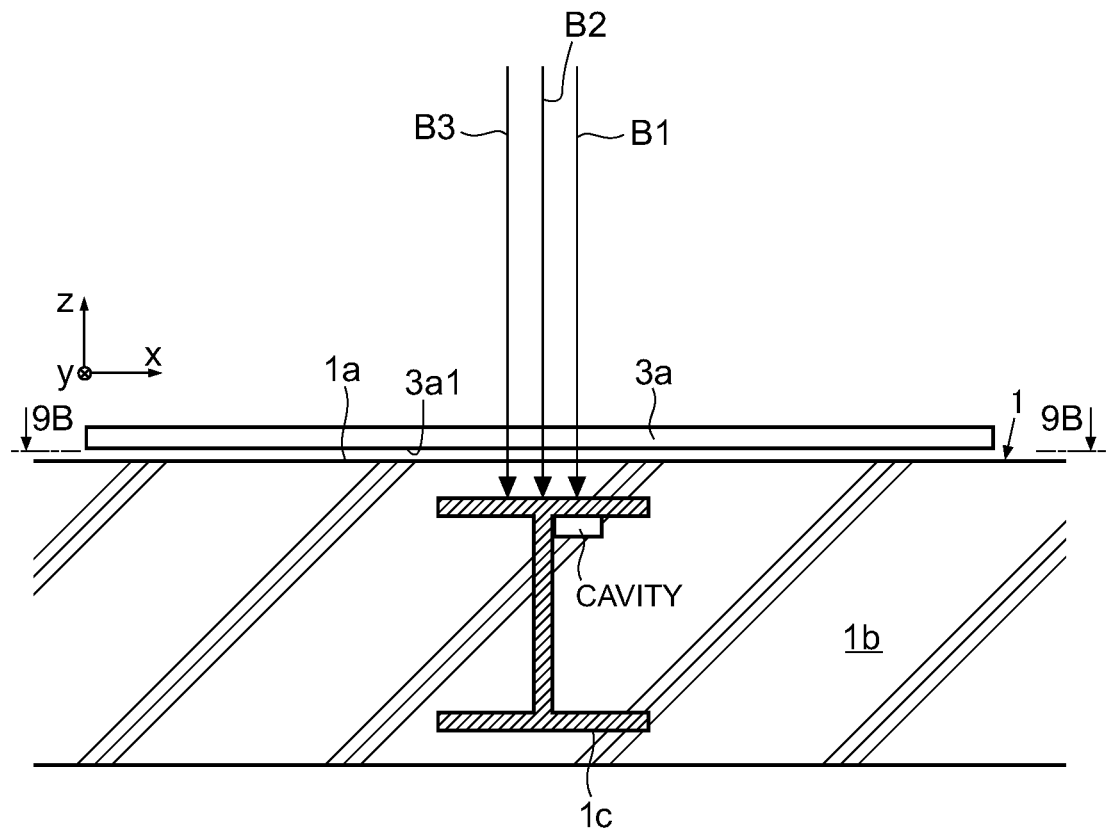
FIG. 9A illustrates a section of an inspection target in the Example 2.
Figure 9B:
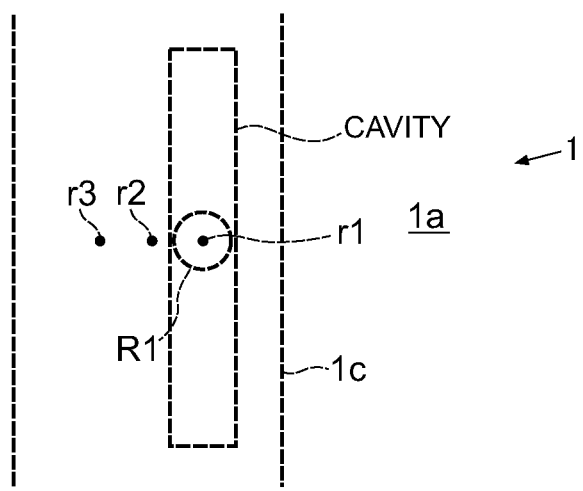
FIG. 9B is a 9B-9B arrow view in FIG. 9A.

The above-described beam scanning was performed using the nondestructive inspecting device 10. In this Example 2, the detector 3a that selectively detects thermal neutrons was used. FIG. 9A illustrates a section of the inspection target 1 for which the beam scanning was performed. FIG. 9B is a 9B-9B arrow view in FIG. 9A. The inspection target 1 in FIG. 9A is the same as that in FIG. 5A. Dimensions of respective portions are also the same as those in FIG. 5C.

In FIG. 9A and FIG. 9B, a cavity existing as a defect inside the inspection target 1 has dimensions of 50 mm, 300 mm, and 3 mm in the x-axis direction, the y-axis direction, and the z-axis direction, respectively.

It is assumed that one cycle is a cycle of performing the above-described steps S3 to S6 once. In each (step S3) of the three cycles, the neutron beam is emitted to the surface 1a of the inspection target 1. The neutron beams emitted in the respective three cycles are denoted by B1 to B3 in FIG. 9A. Each of the irradiation locations in the three cycles is a circular region whose diameter is 40 mm. FIG. 9B illustrates the irradiation location R1 and its center r1 in the first cycle, a center r2 of the irradiation location in the second cycle, and a center r3 of the irradiation location in the third cycle.

Further, the three cycles of the above-described beam scanning were performed with a dimension of the cavity in the z-axis direction being changed to 10 mm, with the other conditions being the same as those described above. In addition, the three cycles of the above-described beam scanning were performed with a dimension of the cavity in the z-axis direction being changed to 30 mm, with the other conditions being the same as those described above.

FIG. 10 illustrates a result of the second cycle when the dimension of the cavity in the z-axis direction is 10 mm, and represents a two-dimensional distribution of the ratio on the detection surface 3a1. In FIG. 10, the horizontal axis and the vertical axis indicate coordinates in an x-axis direction and a y-axis direction illustrated in FIG. 9A, and the origin of each coordinate is the above described center r2 (refer to FIG. 9B). In FIG. 10, an ellipse R drawn by the dashed line is the irradiation location, and the other dashed line indicates an existence region of the cavity when viewed in the z-axis direction.

In FIG. 10, the regions A to D surrounded by solid lines indicate an approximate ratio distribution on the detection surface 3a1. The ratio is smaller than 0.95 in the region A, is equal to or larger than 0.95 and smaller than 1.00 in the region B, and is equal to or larger than 1.00 and smaller than 1.10 in the region C. In the region D, an error is large.

Figure 11:
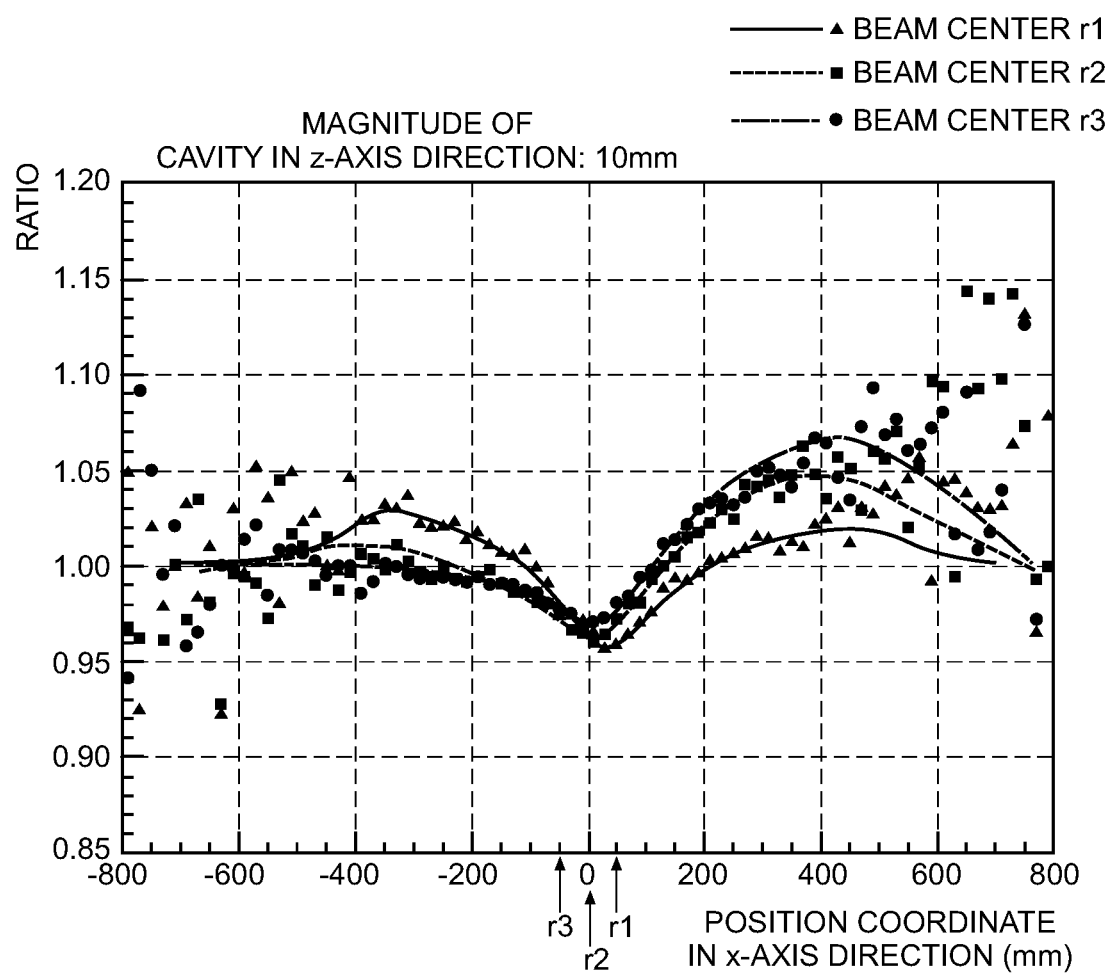
FIG. 11 represents a ratio distribution in an x-axis direction on the detection surface when a defect is a cavity in the Example 2.

FIG. 11 illustrates results when the dimension of the cavity in the z-axis direction is 10 mm, and represents ratio distributions in the x-axis direction on the detection surface 3a1. In FIG. 11, the horizontal axis indicates a position coordinate in the x-axis direction, and the vertical axis indicates the ratio (which is (detected number)/(reference value)). In FIG. 11, the triangle marks indicate the case where the center of the neutron beam irradiation location on the surface 1a of the inspection target 1 is the position r1 in FIG. 9B, the square marks indicate the case where the center of the irradiation location is the position r2 in FIG. 9B, and the circle marks indicate the case where the center of the irradiation location is the position r3 in FIG. 9B. In FIG. 11, the ratios at respective position coordinates indicate the ratios at the same y-axis coordinate as that of the center of the neutron beam irradiation location R1 on the surface 1a. In FIG. 11, when an absolute value of the position coordinate in the x-axis direction exceeds approximately 400 mm, an error in the calculated ratio becomes large. However, the calculated ratio tends to approach 1 on both position-coordinate end sides in the x-axis direction as a position is more separated from the center of the irradiation location, in FIG. 11. For this reason, Sn and Sp may be determined for a position coordinate range in which an error does not exceed an allowable limit.

Figure 12:
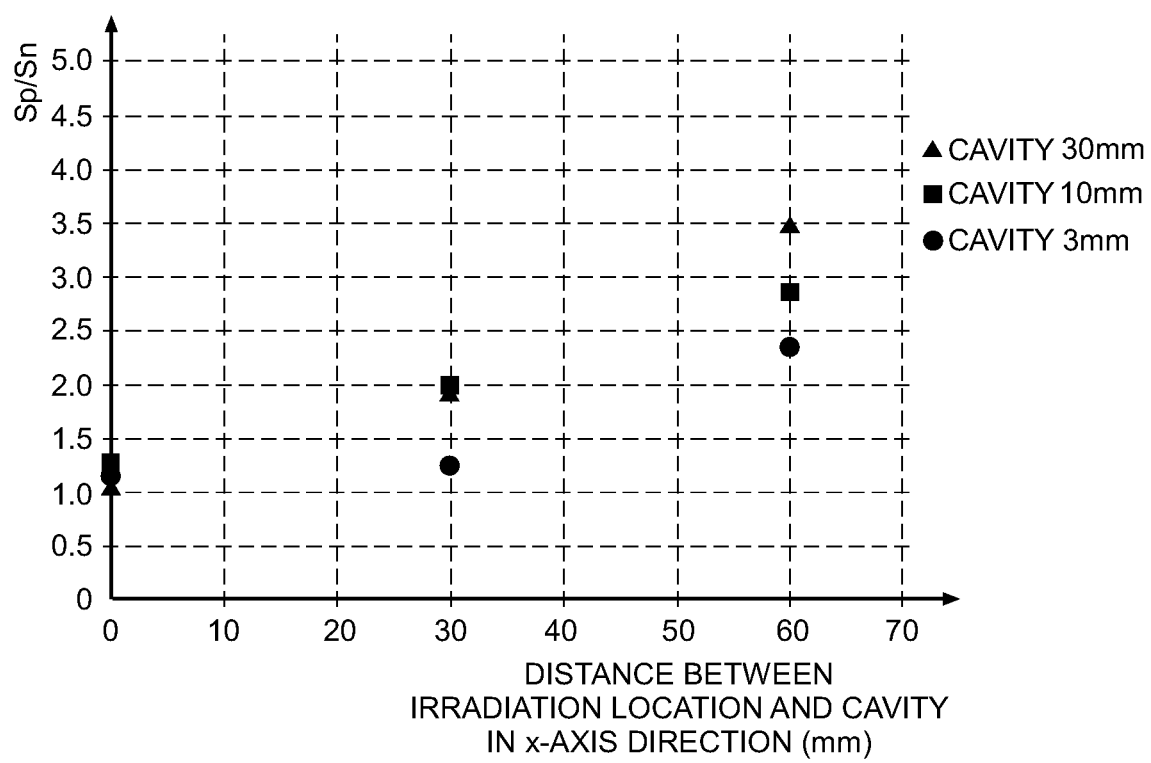
FIG. 12 represents values of Sp/Sn acquired by beam scanning when a defect is a cavity in the Example 2.

FIG. 12 represents values of Sp/Sn acquired by the beam scanning. In FIG. 12, the horizontal axis indicates a distance in the x-axis direction between the center of the irradiation location R and the center of the cavity, and the vertical axis indicates a value of Sp/Sn calculated in each of the cycles of the beam scanning. Here, Sn and Sp are determined in the range of "−300 mm<x<500 mm", in consideration of an error. In FIG. 12, the circle marks indicate the case where a dimension of the cavity in the z-axis direction is 3 mm, the square marks indicate the case where a dimension of the cavity in the z-axis direction is 10 mm, and the triangle marks indicate the case where a dimension of the cavity in the z-axis direction is 30 mm.

As illustrated in FIG. 12, the irradiation location R in the cycle in which the smallest value of Sp/Sn is acquired is closest to the cavity in the inspection target 1. Thus, the irradiation location R corresponding to the smallest value of Sp/Sn can be identified as a location closest to the cavity. For example, when the neutron beam is emitted from a position directly above the cavity in the inspection target 1 to the surface 1a of the inspection target 1, a large number of neutrons pass through the cavity in a direction away from the surface 1a. At this time, these neutrons are not scattered in the cavity toward the detector 3a. It is considered that as a result, the detected number is significantly reduced in a region on the detection surface 3a1 and directly above the cavity. In addition, no thermal neutrons are generated in the cavity. Thus, it is considered that as the irradiation location R is closer to the cavity (a position directly above the cavity), a value of Sn becomes larger, and a value of Sp/Sn becomes smaller.

<Case of Water as Defect>

In FIG. 9A, the above-described beam scanning was performed for the case where a defect was a water staying location instead of a cavity. In this beam scanning, the water staying location is at the same position as that in the above-described case of the cavity, and has respective dimensions of 50 mm, 300 mm, and 10 mm in the x-axis direction, the y-axis direction, and the z-axis direction. In this beam scanning, the detector 3a selectively detecting thermal neutrons was used. The other matters are the same as those in the case of the above-described beam scanning in which the defect was the cavity.

Figure 13:
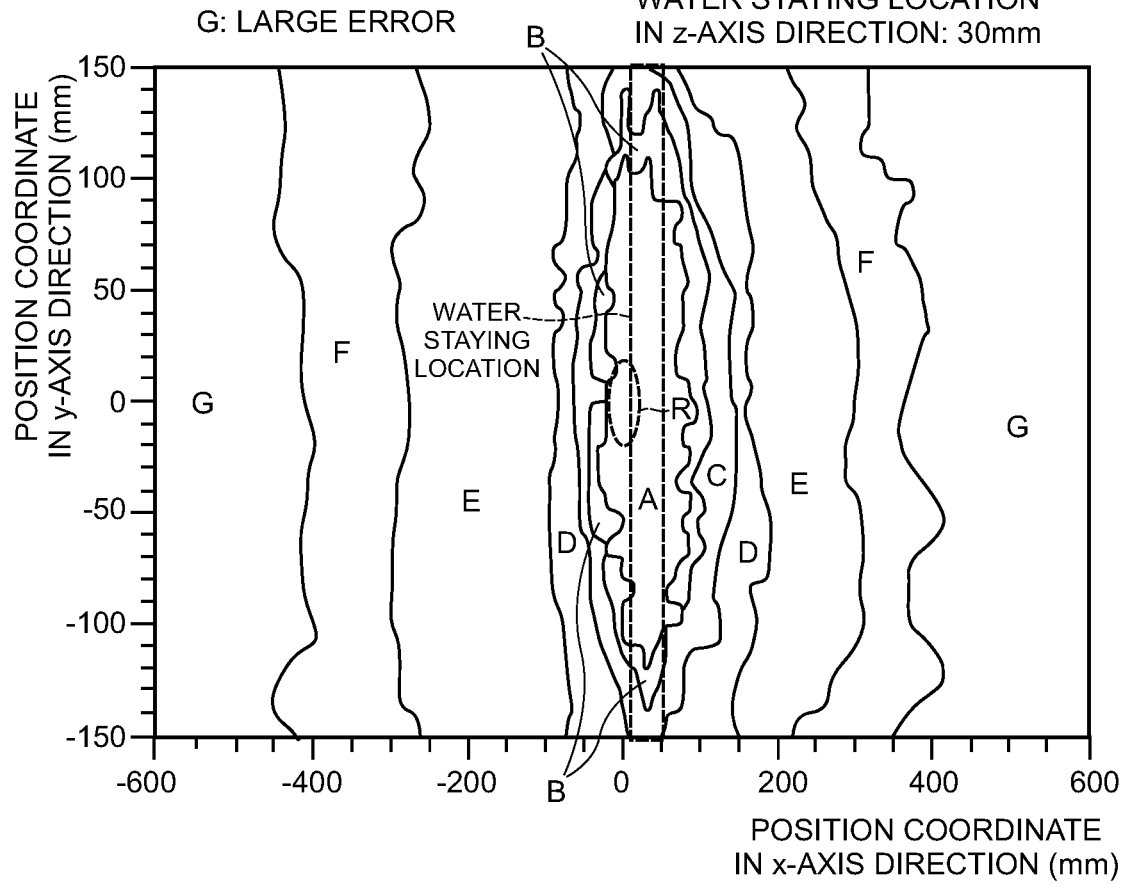
FIG. 13 represents a two-dimensional distribution of ratios on the detection surface when a defect is water in the Example 2.

FIG. 13 represents a two-dimensional distribution of the ratios on the detection surface 3a1 acquired in a second cycle of the beam scanning. In FIG. 13, the horizontal axis and the vertical axis indicate coordinates in the x-axis direction and y-axis direction illustrated in FIG. 9A in the case where the cavity is replaced with the water as a defect. In FIG. 13, the origins of the respective coordinates are the center of the irradiation location 5 in the second cycle. In FIG. 13, the ellipse R drawn by the dashed line indicates the irradiation location, and the other dashed line indicates an existence range of the water staying location when viewed in the z-axis direction.

In FIG. 13, the ratio distribution on the detection surface 3a1 is represented by the respective regions A to D surrounded by the solid lines. Approximately, the ratio is equal to or larger than 1.20 in the region A, is equal to or larger than 1.15 and smaller than 1.20 in the region B, is equal to or larger than 1.10 and smaller than 1.15 in the region C, is equal to or larger than 1.05 and smaller than 1.10 in the region D, is equal to or larger than 1.00 and smaller than 1.05 in the region E, and is equal to or larger than 0.90 and smaller than 1.00 in the region F. In the region G, an error is large.

Figure 14:
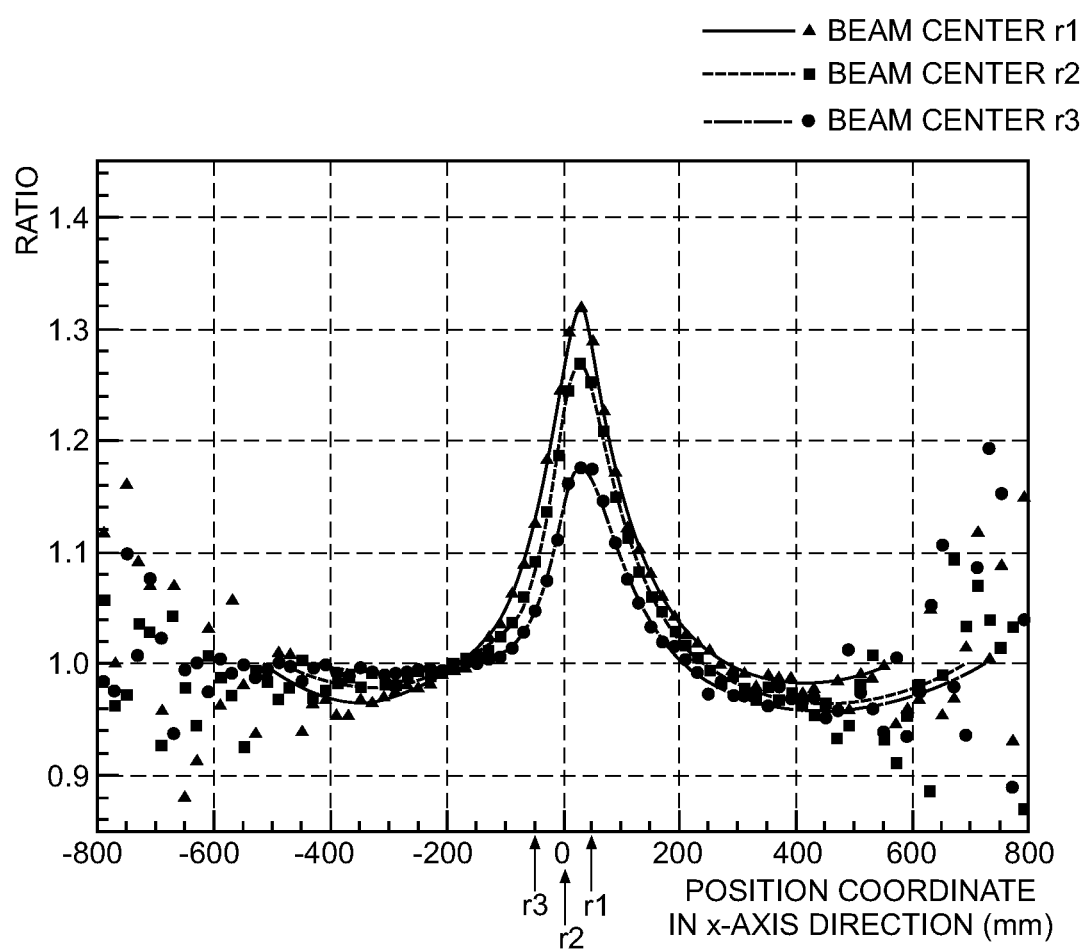
FIG. 14 represents a ratio distribution in the x-axis direction on the detection surface when a defect is water in the Example 2.

FIG. 14 represents the ratio distribution in the x-axis direction on the detection surface 3a1. In FIG. 14, the horizontal axis indicates a position coordinate in the x-axis direction, and the vertical axis indicates the ratio (which is (detected number)/(reference value)). In FIG. 14, the triangle marks indicate the case where the center of the neutron beam irradiation location on the surface 1a of the inspection target 1 is the position r1 in FIG. 9B, the square marks indicate the case where the center is the position r2 in FIG. 9B, and the circle marks indicate the case where the center is the position r3 in FIG. 9B. In FIG. 14, the ratios at the respective position coordinates indicate the ratios at the same y-axis coordinate as that of the center of the irradiation location R of the neutron beam. In FIG. 14, when an absolute value of the position coordinate in the x-axis direction exceeds 400 mm, an error in the calculated ratio becomes large. However, the calculated ratio tends to approach 1 on both position-coordinate end sides in the x-axis direction as a position is more separated from the center of the irradiation location, in FIG. 14.

Figure 15:
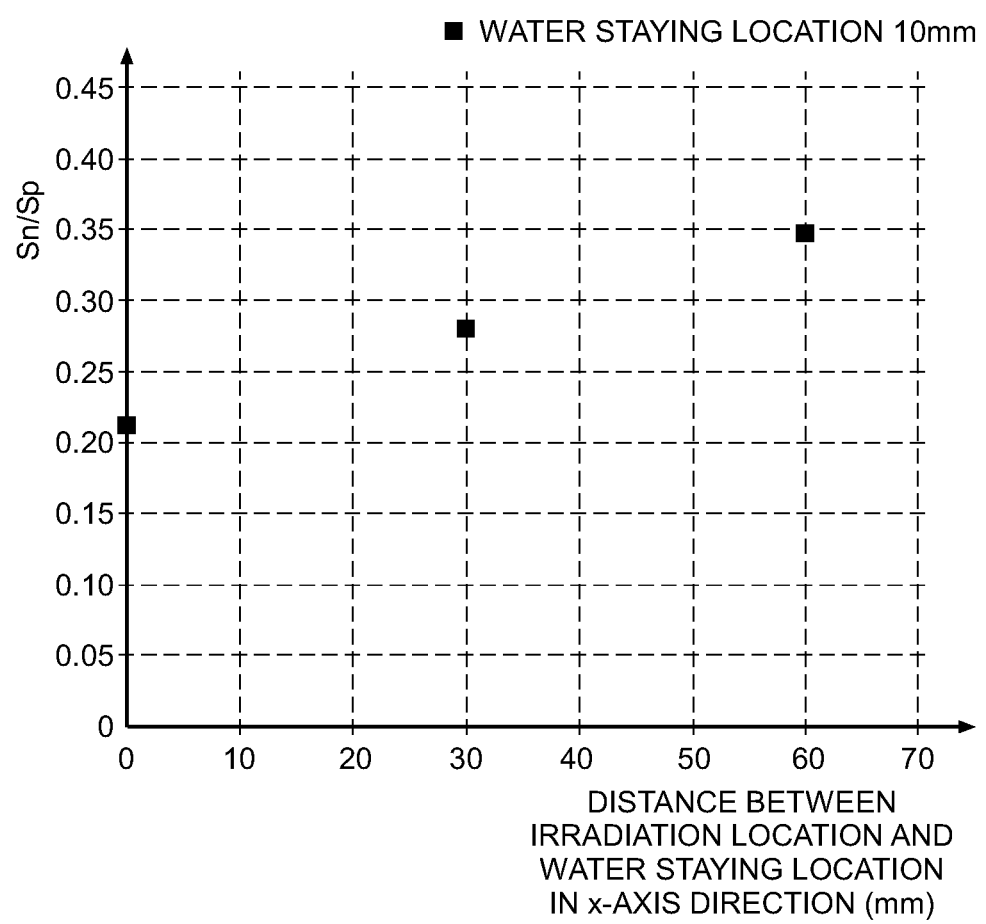
FIG. 15 represents values of Sn/Sp acquired by the beam scanning when a defect is water in the Example 2.

In FIG. 15, the square marks represent values of Sn/Sp acquired by the beam scanning when the water staying location has a dimension of 10 mm in the z-axis direction. In FIG. 15, the horizontal axis indicates a distance in the x-axis direction between the center of the irradiation location R and the center of the water staying location, and the vertical axis indicates a value of Sn/Sp calculated in each cycle of beam scanning.

As illustrated in FIG. 15, it can be determined that the irradiation location R in the cycle in which the smallest value of Sn/Sp is calculated is closest to the water staying location in the inspection target 1. This is based on the following reason. Neutrons tend to scatter with hydrogen atoms in the water staying location and thereby become thermal neutrons. For this reason, it is considered that as the irradiation point R is closer to the water staying location (a position directly above the water staying location), the detected number of thermal neutrons becomes larger, resulting in an increase in Sp and a decrease in Sn/Sp.

Advantageous Effects of Embodiment

As described above, the neutron beam is emitted to the local irradiation location R on the surface 1a of the inspection target 1. As a result, the scattered neutrons are incident on each detection position in the detector 3a. For each detection position, the number of the scattered neutrons incident on the detection position is measured as the detected number. For each detection position, a ratio of the detected number at the detection position to the reference value for the detection position is calculated. The thus-acquired ratio distribution with respect to the detection position includes information indicating existence or absence of a defect and a type of the defect. Thus, existence or absence of a defect and a type of the defect can be detected based on the ratios (ratio distribution) of the respective detection positions in the detector 3a.

For example, it is assumed that magnitude of an increase peak formation portion and magnitude of a decrease peak formation portion in the ratio distribution are Sp and Sn, respectively. When a value of "Sp+Sn" is larger than the first threshold value T1, it can be determined that water or a low-density portion (e.g., a cavity) exists as a defect.

When a value of "Sp+Sn" is larger than the first threshold value T1, and a value of Sn/Sp is equal to or larger than the second threshold value T2, it can be determined that a low-density portion exists as a defect in the inspection target 1.

When a value of "Sp+Sn" is larger than the first threshold value T1, and a value of Sn/Sp is smaller than the second threshold value T2, it can be determined that water exists as a defect in the inspection target 1.

The irradiation location R is set as a local location (e.g., a spot). Thereby, when a defect exists in the inspection target 1, the above-described increase peak formation portion and decrease peak formation portion more distinguishably appear in the ratio distribution.

In the case of detecting existence or absence of a low-density portion (e.g., a cavity), the detector 3a selectively detecting intermediate neutrons enables acquisition of a value of "Sp+Sn" that is highly sensitive to a low-density portion.

By the above-described beam scanning, a value of Sp/Sn or Sn/Sp is acquired for each of the irradiation locations R, and it can be determined that the irradiation location R corresponding to the smallest value of Sp/Sn or Sn/Sp is closest to a low-density portion or a water staying location.

The present invention is not limited to the above-described embodiments, and can be variously modified within the scope of the technical idea of the present invention. For example, the nondestructive inspecting device 10 according to each of the embodiments of the present invention does not need to achieve all of the above-described advantageous effects. The nondestructive inspecting device 10 according to each of the embodiments of the present invention does not need to include all of a plurality of the above-described constituent elements, and may include only a part of a plurality of the above-described constituent elements.

According to the present invention, any one of the following modified examples 1 to 8 may be adopted, or two or more of the modified examples 1 to 8 may be adopted in any combination. In this case, the matters that are not described below are the same as those described above.

Modified Example 1

In the above description, the neutron emission device 2 emits a pulsed neutron beam to an irradiation location R. However, the irradiation location R may be irradiated with a continuous neutron beam that is temporally continuous. In this case, the detection device 3 may measure the detected number at each detection position in the detector 3a over a predetermined time section (predetermined time) that enables an increase peak formation portion and a decrease peak formation portion to occur in the above-described ratio distribution when a defect such as a water staying portion or a low-density portion exists in the inspection target 1.

Modified Example 2

When a type of a defect is not determined, the determination value calculation unit 8 does not need to calculate a value of Sn/Sp.

Modified Example 3

Although not described above, the nondestructive inspecting device 10 may further include a display 11 as illustrated in FIG. 1A.

When the display 11 is provided, the data processing unit 7, the determination value calculation unit 8, and the determination unit 9 may be omitted. In this case, the ratio calculation unit 5 may output the ratios of the respective detection positions in the detector 3a to the display 11 as a ratio distribution with respect to the detection positions. In this case, the output ratio distribution may be displayed on the display 11, and a person may determine existence or absence of a defect and a type of the defect by looking at the displayed ratio distribution.

The ratio distribution displayed on the display 11 may be represented by a two-dimensional coordinate system having a coordinate axis indicating each detection position (e.g., the x-axis in FIG. 1A) and a coordinate axis indicating the ratio, as illustrated in FIG. 2A to FIG. 2D, for example. Alternatively, the ratio distribution displayed on the display 11 may be represented by a three-dimensional coordinate system having two mutually orthogonal coordinate axes (e.g., the x-axis and the y-axis in FIG. 1A) indicating respective detection positions and a coordinate axis indicating the ratio. Alternatively, the ratio distribution displayed on the display 11 may be represented in a two-dimensional surface (the detection surface 3a1) displayed on the display 11 such that the magnitude of the ratios at the respective detection positions is represented by a plurality of regions (e.g., the regions A to E in FIG. 7A), colors, or shades, as in FIG. 7A and FIG. 7B. A range of values of the ratios may differs between a plurality of the regions, and an upper limit and a lower limit of the range of the ratios for each of the regions may also be displayed on the display 11.

Alternatively, when the display 11 is provided, only the determination unit 9 among the data processing unit 7, the determination value calculation unit 8, and the determination unit 9 may be omitted. In this case, the determination value calculation unit 8 may output values of "Sp+Sn" and Sn/Sp as the calculated determination values to the display 11. In this case, the respective output determination values are displayed on the display 11, and a person may determine existence or absence of a defect and a type of the defect by looking at the displayed respective determination values. In this case, the display 11 may further display the ratio distribution as described above.

Alternatively, when the display 11 is provided, only the determination value calculation unit 8 and the determination unit 9 among the data processing unit 7, the determination value calculation unit 8, and the determination unit 9 may be omitted. In this case, the data processing unit 7 may output values of Sp and Sn to the display 11. In this case, the respective output values of Sp and Sn may be displayed on the display 11, and a person may determine existence or absence of a defect and a type of the defect by looking at the displayed values. In this case, the display 11 may further display the ratio distribution as described above.

Modified Example 4

In the above description, magnitude of the increase peak formation portion in the ratio distribution is expressed by an area, but may be the maximum value (a peak value in the positive direction) of the ratios in the increase peak formation portion. In this case, magnitude of the decrease peak formation portion in the ratio distribution may be the minimum value (a peak value in the negative direction) of the ratios in the decrease peak formation portion.

Modified Example 5

The ratio distribution (the ratios of the respective detection positions in the detector 3a) output by the ratio calculation unit 5 may be a distribution expressed with respect to one-dimensional coordinates (x coordinates) as illustrated in FIG. 2A to FIG. 2D, i.e., may be a distribution expressed by a two-dimensional coordinate system having an x-axis and a ratio axis, or may be a distribution expressed with respect to two-dimensional coordinates (x-axis coordinates and y-axis coordinates), i.e., may be a distribution expressed by a three-dimensional coordinate system having an x-axis, a y-axis, and a ratio axis.

In the latter case, magnitude of the increase peak formation portion may be a volume of a region sandwiched between a portion where the ratio is 1 and the increase peak formation portion. In other words, the magnitude of the increase peak formation portion may be $\int\{f(x, y)-1\}dxdy$ when the ratio curved surface representing the ratio distribution is expressed by "ratio=f(x, y)", where x and y are the position coordinates representing the two-dimensional coordinates on the detection surface $3a1$. This integration is performed over the x section and the y section of the increase peak formation portion. In this case, similarly, magnitude of the decrease peak formation portion may also be a volume of a region sandwiched between the portion where the ratio is 1 and the decrease peak formation portion. In other words, similarly to the case of the increase peak formation portion, the magnitude of the decrease peak formation portion may be $\int\{1-f(x, y)\}dxdy$.

When the ratio distribution is expressed by the two-dimensional coordinate system as described above, the data processing unit 7 may generate a curve (e.g., the ratio curve C1 in FIG. 2A) approximating the ratio distribution in the two-dimensional coordinate system, and may determine values of Sp and Sn described above, based on this curve. When the ratio distribution is expressed by the three-dimensional coordinate system as described above, the data processing unit 7 may generate a curved surface (e.g., f(x, y) described above) approximating the ratio distribution in the three-dimensional system, and may determine values of Sp and Sn described above, based on this curved surface.

(Modified Example 6)

In the above, the above-described step S8 is performed on the assumption that a defect in the inspection target 1 is either a low-density portion (e.g., a cavity) or a water staying location (or iron rust). However, in the case where this assumption is not made, when a result of the determination at the step S7 is negative, it may be determined that another assumed defect exists. For example, in the case where a target (e.g., the above-described waterproof sheet or optical fiber cable) for deterioration determination exists in the inspection target 1, when a result of the determination at the step S7 is negative, it may be determined that a defect such as deterioration of the target (e.g., the waterproof sheet or a cover (sheath) of the optical fiber cable) exists. In other words, it may be assumed that the negative result of the determination at the step S7 indicates such deterioration.

Modified Example 7

Although the detector 3a includes the detection surface 3a1 extending two-dimensionally in the above description, the present invention is not limited to this. For example, the detector 3a may extend in a rod shape (e.g., in the x-axis direction in FIG. 1A). In this case, such a rod-shaped detector 3a includes a plurality of (e.g., a large number of) detection positions arranged in the rod shape. The rod-shaped detector 3a is used in performing the steps S2 to S4, thereby acquiring the detected numbers at a large number of detection positions over the one-dimensionally extending (rod-shaped) range.

The rod-shaped detector 3a may be used in performing the steps S2 to S4 a plurality of number of times. In this case, a position of the detectors 3a differs among such a plurality of number of times, and the other conditions are the same for such a plurality of number of times. Thereby, the detected numbers at a large number of detection positions over a two-dimensionally extending range may be acquired, and the ratio at each of these detection positions may be determined as in the above-described step S5. Then, existence or absence of a defect and a type of the defect may be determined based on the ratios (ratio distribution) at these detection positions as in the above-described steps S7 and S8, or this ratio distribution may be displayed on the display 11. A position and an orientation of the detector 3a at the steps S2 to S4 of each time may be input to the detection device 3 by appropriate means (e.g., an input device operated by a person), and based on this input, the detection device 3 may recognize association between each detection position and the detected number.

The detector 3a may be a spot-shaped detector including one detection position. In this case, the steps S2 to S4 are performed such a large number of times. In this case, a position of the detectors 3a differs among such a large number of times, and the other conditions are the same for such a large number of times. Thereby, the detected numbers at a large number of detection positions over a one-dimensionally or two-dimensionally extending range may be acquired, and the ratio at each of these detection positions may be determined. In this case, the other matters are the same as those in the case of using the rod-shaped detector 3a in performing the steps S2 to S4 a plurality of number of times.

(Modified Example 8)

The ratio calculation unit 5 may determine the above-described ratios, using the normalized reference values and the normalized detected numbers as follows.

The reference value for each detected position i (i is an identifier of the detection position, which applies to the following) may be a value acquired by normalizing, with Na, the number $\alpha i$ of scattered neutrons that result from Na neutrons emitted to the inspection target 1 including no defects inside and that are detected at the detection position i. In other words, each reference value Ri for each detection position i may be "Ri=$\alpha i$/Na".

Similarly, the detected number at each detection position i may be a value acquired by normalizing, with Nb, the number $\beta i$ of scattered neutrons that result from Nb neutrons emitted to the inspection target 1 from the neutron emission device 2 at the above-described step S3 and that are detected at the detection position i. In other words, the detected number Di at each detection position i may be "Di=($\beta i$/Nb)".

The ratio calculation unit 5 calculates Di/Ri as the ratio for each detection position i. When calculating the ratio, the ratio calculation unit 5 may calculate "Di=($\beta i$/Nb)" as the detected number from a known value of Nb and a value of $\beta i$ that is measured by the measurement unit 3b. The normalized reference value Ri may be stored in the storage unit 6.

In this modified example 8, Na and Nb described above may be different from each other, and the time during which the neutron beam is emitted to the inspection target 1 (irradiation location R) at the step S3 may be different from the corresponding time (neutron beam emission time) for the setting of the reference values. In the modified example 8, each of the time during which the detected number of scattered neutrons is measured at the step S4 and the corresponding time for the setting of the reference values may be the time until the number of neutrons scattered from the inspection target 1 per unit time becomes sufficiently small (e.g., becomes substantially zero).

REFERENCE SIGNS LIST

1 Inspection target
1a Surface

1b Concrete
1c H-shaped steel
2 Neutron emission device
2a Neutron source
2b Collimator
3 Detection device
3a Detector
3a1 Detection surface
3b Measurement unit
5 Ratio calculation unit
6 Storage unit
7 Data processing unit
8 Determination value calculation unit
9 Determination unit
10 Nondestructive inspecting device
11 Display
R Irradiation location

The invention claimed is:

1. A non-destructive inspecting device comprising:
a neutron emission device that emits a neutron beam to a local irradiation location on a surface of an inspection target;
a detection device that detects, at each of inspection positions facing the surface, scattered neutrons returned from the inspection target as a result of emission of the neutron beam to the irradiation location, and measures a detected number of the scattered neutrons at each of the detection positions;
a ratio calculation unit that calculates, for each of the detection positions, a ratio of the detected number at the detection position to a reference value for the detection position;
a data processing unit that identifies an increase peak formation portion and a decrease peak formation portion of the ratio, and determines magnitude Sp of the increase peak formation portion and magnitude Sn of the decrease peak formation portion; and
a determination unit that determines a defect in the inspection target, based on Sp and Sn.

2. The non-destructive inspecting device according to claim 1,
wherein the irradiation location is an irradiation spot.

3. The non-destructive inspecting device according to claim 1,
wherein the neutron emission device includes a neutron source that emits neutrons, and a collimator that shapes the neutrons from the neutron source into the neutron beam having a reduced cross-section.

4. The non-destructive inspecting device according to claim 1, further comprising a display that displays a distribution of the ratios with respect to the detection positions.

5. A non-destructive inspecting method comprising:
a step (A) of emitting a neutron beam to a local irradiation location on a surface of an inspection target;
a step (B) of detecting, at each of inspection positions facing the surface, scattered neutrons returned from the inspection target as a result of the step (A), and measuring a detected number of the scattered neutrons at each of the detection positions; and
a step (C) of calculating, by a ratio calculation unit, for each of the detection positions, a ratio of the detected number at the detection position to a reference value for the detection position, and outputting the ratios;
a step (D) of identifying an increase peak formation portion and a decrease peak formation portion of the ratio in a distribution of the ratios with respect to the detection positions, and determining magnitude Sp of the increase peak formation portion and magnitude Sn of the decrease peak formation portion; and
determining a defect in the inspection target, based on Sp and Sn.

6. The non-destructive inspecting method according to claim 5, comprising:
a step (E) of calculating Sp/Sn or Sn/Sp; and
repeatedly performing the steps (A) to (E) while changing the irradiation location to which the neutron beam is emitted at the step (A); and
identifying, as a location closest to a low-density portion or water staying location, the irradiation location corresponding to a smallest value among a plurality of values of Sp/Sn or Sn/Sp determined at the step (E) a plurality of number of times.

7. The non-destructive inspecting device according to claim 1, comprising a determination value calculation unit that calculates and outputs "Sp+Sn" and Sn/Sp,
wherein the determination unit determines existence or absence of a defect and a type of the defect, based on "Sp+Sn" and Sn/Sp.

8. The non-destructive inspecting device according to claim 7,
wherein the determination unit:
outputs a defect absence signal when "Sp+Sn" is equal to or smaller than a first threshold value T1;
outputs a first defect signal when "Sp+Sn" is larger than the first threshold value T1 and Sn/Sp is equal to or larger than a second threshold T2; and
outputs a second defect signal when "Sp+Sn" is larger than the first threshold value T1 and Sn/Sp is smaller than the second threshold T2, and
the first defect signal and the second defect signal are signals for identifying existence or absence of a defect and a type of the defect.

9. The non-destructive inspecting device according to claim 1,
wherein the reference value is set for each of the detection positions.

10. The non-destructive inspecting device according to claim 1,
wherein the detection device selectively detects thermal neutrons or intermediate neutrons as the scattered neutrons at each of the detection positions, and measures the detected number of the thermal neutrons or the intermediate neutrons at each of the detection positions.

11. The non-destructive inspecting method according to claim 5,
wherein the reference value is set for each of the detection positions.

* * * * *